(12) United States Patent
Mohlin et al.

(10) Patent No.: US 11,913,389 B2
(45) Date of Patent: Feb. 27, 2024

(54) METHOD FOR CONTROLLING AN INTERNAL COMBUSTION ENGINE, A COMPUTER PROGRAM, A COMPUTER READABLE MEDIUM, A CONTROL UNIT, AN INTERNAL COMBUSTION ENGINE, AND A VEHICLE

(71) Applicant: VOLVO TRUCK CORPORATION, Gothenburg (SE)

(72) Inventors: Anders Mohlin, Kungsbacka (SE); Malin Ehleskog, Hisings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 174 days.

(21) Appl. No.: 17/276,384

(22) PCT Filed: Oct. 1, 2018

(86) PCT No.: PCT/EP2018/076675
§ 371 (c)(1),
(2) Date: Dec. 28, 2021

(87) PCT Pub. No.: WO2020/069721
PCT Pub. Date: Apr. 9, 2020

(65) Prior Publication Data
US 2022/0282676 A1    Sep. 8, 2022

(51) Int. Cl.
*F02D 41/00* (2006.01)
*F02D 41/02* (2006.01)
(Continued)

(52) U.S. Cl.
CPC .......... *F02D 41/0007* (2013.01); *F02B 37/18* (2013.01); *F02D 41/024* (2013.01);
(Continued)

(58) Field of Classification Search
CPC ............ F02D 41/0007; F02D 41/1446; F02D 41/1448; F02D 2200/021; F02D 2700/04
See application file for complete search history.

(56) References Cited

U.S. PATENT DOCUMENTS

2014/0123968 A1    5/2014   Farman et al.
2016/0169127 A1    6/2016   Rammer et al.
(Continued)

FOREIGN PATENT DOCUMENTS

CN    105626290 A    6/2016
CN    105697096 A    6/2016
(Continued)

OTHER PUBLICATIONS

European Office Action dated Apr. 21, 2022 in corresponding European Patent Application No. 18782701.9, 7 pages.
(Continued)

*Primary Examiner* — Ngoc T Nguyen
(74) *Attorney, Agent, or Firm* — Venable LLP; Jeffri A. Kaminski

(57) ABSTRACT

The invention relates to a method to control an internal combustion engine. The internal combustion engine comprises a cylinder, an air guide arranged to guide an airflow to the cylinder, an exhaust guide arranged to guide an exhaust flow from the cylinder. The method comprises the step to determine a value of at least one engine operation parameter. Further, the method comprises the step to determine a target value of an exhaust performance parameter
(Continued)

depending on the determined engine operation parameter value. Lastly, the air flow through the air guide and the exhaust flow through the exhaust guide is controlled depending on the determined target exhaust performance parameter value.

11 Claims, 17 Drawing Sheets

(51) Int. Cl.
  *F02D 41/14*   (2006.01)
  *F02B 37/18*   (2006.01)
(52) U.S. Cl.
  CPC ..... *F02D 41/1446* (2013.01); *F02D 41/1448* (2013.01); *F02D 2200/021* (2013.01); *F02D 2200/0802* (2013.01); *F02D 2200/101* (2013.01); *F02D 2700/04* (2013.01)

(56) References Cited

U.S. PATENT DOCUMENTS

| | | | |
|---|---|---|---|
| 2018/0003118 A1 | 1/2018 | zur Loye et al. | |
| 2018/0171904 A1 | 6/2018 | Ulrey et al. | |
| 2019/0249606 A1* | 8/2019 | Mohlin | F02D 13/0249 |
| 2022/0034270 A1* | 2/2022 | Mohlin | F02B 37/18 |

FOREIGN PATENT DOCUMENTS

| | | |
|---|---|---|
| CN | 108349498 A | 7/2018 |
| CN | 109072772 A | 12/2018 |
| EP | 1420150 A1 | 5/2004 |
| WO | 2015095127 A1 | 6/2015 |
| WO | 2015108472 A1 | 7/2015 |
| WO | 2017086873 A1 | 5/2017 |
| WO | 2018065053 A1 | 4/2018 |

OTHER PUBLICATIONS

International Search Report and Written Opinion dated Jun. 4, 2019 in corresponding International PCT Application No. PCT/EP2018/076675, 15 pages.
Chinese Office Action dated Nov. 30, 2022 in corresponding Chinese Patent Application No. 201880098042.X, 23 pages.
Internal Combustion Engine and Compressor, Yulian LI, China Coal Industry Publishing House, Apr. 1988, pp. 7-11.
Chinese Office Action dated Jun. 17, 2023 in corresponding Chinese Patent Application No. 201880098042.X, 20 pages.

* cited by examiner

METHOD FOR CONTROLLING AN INTERNAL COMBUSTION ENGINE, A COMPUTER PROGRAM, A COMPUTER READABLE MEDIUM, A CONTROL UNIT, AN INTERNAL COMBUSTION ENGINE, AND A VEHICLE

CROSS-REFERENCE TO RELATED APPLICATIONS

This application is a U.S. National Stage application of PCT/EP2018/076675, filed Oct. 1, 2018, and published on Apr. 9, 2020, as WO 2020/069721 A1, all of which is hereby incorporated by reference in its entirety.

TECHNICAL FIELD

The invention relates to a method for controlling an internal combustion engine, a computer program, a computer readable medium, a control unit, an internal combustion engine, and a vehicle.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as a car.

BACKGROUND

WO 2015/108472 A1 provides a method and a system arranged for control of at least, one temperature for an exhaust treatment system in a vehicle. The system comprises a first determination unit, which is arranged for the determination of the at least one temperature for the exhaust treatment system, and a second determination unit, which is arranged for the determination of an order of priority for the use of brakes in the vehicle. The order of priority is determined based on the at least one temperature. However, further improvements are needed. In particular, in existing solutions considerable time and/or effort is needed to heat up a cold exhaust aftertreatment system.

SUMMARY

An object of the invention is to decrease the emissions of internal combustion engines in vehicles, especially at low ambient temperatures and/or after a cold start and/or at a low engine load. Preferably, a further object of the invention is to decrease the emissions of an internal combustion engine already heated up at a low engine load.

According to a first aspect of the invention, the object is achieved by a method for controlling an internal combustion engine according to claim 1. The internal combustion engine comprises a cylinder, an air guide arranged to guide an air flow to the cylinder, and an exhaust guide arranged to guide an exhaust flow from the cylinder. The method comprises the step to determine a value of at least one engine operation parameter. The method is characterized by the step to determine a target value of an exhaust performance parameter depending on the determined engine operation parameter value. Further, the method comprises, depending on the determined target exhaust performance parameter value, the step to control the air flow through the air guide and the step to control the exhaust flow through the exhaust guide.

The method can be applied to control the internal combustion engine to decrease emissions of internal combustion engines in vehicles. In particular, the method can be applied to control the air flow to the cylinder and the exhaust flow from the cylinder to quickly heat up an exhaust aftertreatment system.

The internal combustion engine is provided to drive a vehicle. Such an internal combustion engine may be provided as a diesel engine or a gasoline engine. Preferably, the internal combustion engine is a four-stroke internal combustion engine. In a four-stroke internal combustion engine a piston completes four strokes in one cycle. In the first stroke, the so called intake, the air flow is sucked into the cylinder. In the fourth stroke, known as exhaust, flue gas is pushed out of the cylinder providing a flue gas flow. Preferably, the flue gas flow is the exhaust flow. Thus, the exhaust guide is provided downstream of the cylinder to guide the exhaust flow from the cylinder. Preferably, the internal combustion engine comprises one, two or more exhaust guides. The second and third strokes are known as compression and combustion. The internal combustion engine can comprise one or more cylinders.

The internal combustion engine is preferably provided with at least one turbocharger. The turbocharger has a compressor and a turbine. The turbine is driven with an exhaust flow from the cylinder. In turn, the turbine drives the compressor, preferably by means of a joint shaft. The driven compressor provides said compressed air to the cylinders for combustion.

Preferably, the compressor is connected to the cylinder by means of the air guide. The air guide is arranged to guide the air flow from the compressor to the cylinder. The turbine is connected to the cylinder by means of the exhaust guide. Further, downstream of the turbine, a turbine outlet guide may be provided that may guide the expanded exhaust flow from the turbine. Preferably, the turbine outlet guide is arranged to guide the flue gas to an exhaust aftertreatment system.

The internal combustion engine preferably is provided with an adjustable air flow restriction element arranged upstream of the cylinder to control the air flow guided through the air guide, in particular, between the compressor and the cylinder. Further preferably, the internal combustion engine is provided with an adjustable exhaust flow restriction element arranged downstream of the cylinder to control the exhaust flow guided through the exhaust guide, in particular, between the cylinder and the turbine. The respective adjustable flow restriction element may be provided as an adjustable valve or throttle or flap. Preferably, the respective adjustable flow restriction element is continuously or discretely adjustable. In particular, the respective adjustable flow restriction element may be adjustable between an open position providing a respective maximum flow and a closed position providing a respective minimum flow, e.g. 70 g per second. It is to be understood that the respective minimum flow may depend, for example, on the type of the internal combustion engine or specification on an exhaust aftertreatment system.

Preferably, the respective adjustable flow restriction element provides a respective adjustable flow area, which is, preferably, adjustable between different area dimensions. In particular, the respective flow area is a cross-sectional area of a flow channel of the respective adjustable flow restriction element through which the respective flow passes.

Preferably, the adjustable air flow restriction element may be controlled by means of an air flow control signal value and the adjustable exhaust flow restriction element may be controlled by means of an exhaust flow control signal value. The respective flow control signal may preferably be a pneumatic and/or hydraulic and/or electromagnetic control signal. The pneumatic control signal and the hydraulic control signal may preferably be a pressure or flow rate signal. The electromagnetic control signal may preferably be a voltage or current signal. Preferably, the method may comprise the step of providing a respective flow control signal value to control the respective flow. In particular, the method may comprise the step of determining and/or generating and/or storing a respective flow control value.

The method for controlling such an internal combustion engine comprises the step of determining a value of at least one engine operation parameter.

An engine operation parameter preferably is a parameter that is characteristic for the operation of an internal combustion engine. Preferably, values for two or a plurality of three or more engine operation parameters, in particular different engine operation parameters, are determined. In this way, a more detailed control can be realized. Determining the engine operation parameter value may include the step of calculating and/or estimating and/or measuring the engine operation parameter value. Thus, the internal combustion engine can comprise at least one sensor to measure the engine operation parameter value. To make use of the determined engine operation parameter value for controlling the internal combustion engine, the method can comprise the step of storing a determined engine operation parameter value.

The target exhaust performance parameter value is determined depending on the determined engine operation parameter value(s).

An exhaust performance parameter preferably is a parameter that is characteristic for the exhaust performance of an internal combustion engine. Preferably, target values for two or a plurality of three or more exhaust performance parameters, in particular different exhaust performance parameters, are determined. In this way, a more detailed control can be realized. A target exhaust performance parameter value can be described as a desired value of an exhaust performance parameter to be achieved or reached or approached. The target exhaust performance parameter value to be determined may change depending on the determined engine operation parameter value. To make use of the determined target exhaust performance parameter value for controlling the internal combustion engine, the method can comprise the step of storing a determined target exhaust performance parameter value.

The respective flows are controlled depending on a determined target exhaust performance parameter value.

Controlling the air flow or the exhaust flow can comprise restricting the respective flow. The respective flow may be controlled such that they are zero. Further, controlling the respective flow can comprise increasing or boosting the respective flow. Controlling the respective flow preferably includes, for example continuously, adjusting, in particular, between a minimum and maximum respective flow. Controlling the respective flow through the respective guide may comprise controlling the respective adjustable flow restriction element, respectively, so that the respective flow area is suitably adjusted.

In particular, controlling the respective flow may comprise increasing and/or reducing and/or maintaining the respective flow pressure. Further, controlling the respective flow may comprise increasing and/or reducing and/or maintaining the air flow or exhaust flow with regards to its mass flow and/or volume flow. Controlling a flow preferably comprises maintaining a previous or current flow.

A determined target exhaust performance parameter value can be decoded into a value of an air flow control signal to control the air flow and/or into a value of an exhaust flow control signal to control the exhaust flow. Thus, the method may comprise the step of decoding the determined target exhaust performance parameter value into a respective value of a flow control signal, in particular, to control the respective adjustable flow restriction element. In particular, controlling the respective flow comprises the step of controlling the respective adjustable flow restriction element depending on the respective flow control signal value. Preferably, the method may comprise the step of storing a respective decoded flow control signal value.

Preferably, the internal combustion engine, in particular the respective flows, are controlled open loop or closed loop. In particular, different control strategies may be adopted. For example, both the air flow and the exhaust flow can be controlled open loop. In particular, both the air flow and the exhaust flow can be controlled closed loop. Further preferably, the air flow can be controlled closed loop and the exhaust flow can be controlled open loop or vice versa. It can also be preferred to choose and/or switch between control strategies in different circumstances and/or situations.

All or some of the steps of the method described herein may preferably be performed in the order described herein. Further preferably, all or some of steps of the method described herein may be performed in any order. In particular, all or some of steps of the method described herein may be performed in series or in parallel. For example, for controlling the internal combustion engine, some of the steps of the method may be performed in series and other steps of the method may be performed in parallel.

The method as described herein provides an advantageous solution to decrease the emissions of internal combustion engines in vehicles, especially at low ambient temperatures and/or a low engine coolant temperature value and/or after a cold start. Controlling both the air flow and the exhaust flow has the technical effect to increase the exhaust power of the internal combustion engine, which leads to a better performance of an exhaust aftertreatment system and thus a reduction in emissions. In particular, the method for controlling an internal combustion engine allows heating up an exhaust aftertreatment system more quickly.

Further preferably, the method has the advantage to make use of an increased expansion ratio of the turbine, in particular when the adjustable exhaust flow restriction element is arranged between the cylinder and the turbine. Such an arrangement may increase the exhaust mass flow to an exhaust aftertreatment system. Nevertheless, by means of the adjustable air flow restriction element, the exhaust mass flow being provided to an exhaust aftertreatment system can be decreased. Thus, even if the exhaust flow is reduced by means of the adjustable exhaust flow restriction element, the exhaust aftertreatment system may be provided with a higher exhaust power to quickly heat up the exhaust aftertreatment system due to a higher exhaust temperature value. In some load points, it may be preferred that the adjustable exhaust flow restriction element is controlled to reduce the exhaust flow area and, yet, to increase the exhaust flow with regards to the mass flow providing a higher exhaust power. In particular, the method provides the advantage to choose between a high exhaust mass flow and a high exhaust temperature value. Preferably, depending on the determined current engine operation parameter value(s) and/or the determined current exhaust performance parameter value(s), the method provides the advantage to choose between a high exhaust mass flow and a high exhaust temperature value.

According to one embodiment of the method described herein, the at least one engine operation parameter is at least one of the following: an engine speed, and/or an engine load, and/or a coolant temperature, and/or an ambient temperature. Further, the exhaust performance parameter is at least one of the following: an exhaust temperature, and/or an exhaust mass flow, and/or an exhaust manifold pressure, and/or an exhaust power.

Further preferably, an engine operation parameter can be a fuel flow and/or an engine oil temperature. Furthermore, an exhaust performance parameter may be a turbine outlet temperature that is, for example, the temperature inside of the turbine outlet guide or at or inside of an exhaust aftertreatment system.

Preferably, the engine speed is the rotational speed of an internal combustion engine, in particular the rotational speed of its crankshaft. Determining the engine speed may comprise the steps of measuring the engine speed by means of a speed sensor. Further, the method may comprise the step of storing a determined engine speed value.

Preferably, the engine load is the torque output of an internal combustion engine. Determining the engine load may comprise determining an air flow and a fuel flow provided for the combustion stroke, in particular, calculating depending on the air flow and a fuel flow provided for combustion. Further preferably, determining the engine load may comprise measuring the engine load by means of a torque sensor. Further preferably, the method may comprise the step of storing a determined engine load value.

Preferably, the coolant temperature is the temperature of a coolant medium cooling the internal combustion engine. The coolant medium may be air and/or a liquid such as water. In particular, the internal combustion engine comprises an engine coolant system adapted to cool an internal combustion engine with air and/or a liquid. Preferably, such an engine coolant system has a coolant temperature sensor to determine, in particular, measure the coolant temperature. Further preferably, determining the coolant temperature may comprise estimating and/or calculating the coolant temperature.

Preferably, the ambient temperature is a temperature periphery to the internal combustion engine. In particular, the ambient temperature is a temperature outside of the internal combustion engine. Further preferably, the ambient temperature is a temperature periphery to a vehicle having the internal combustion engine. Further preferably, the ambient temperature is determined at a plurality of locations.

Preferably, the exhaust temperature is the temperature of the exhaust flow. Preferably, the exhaust temperature is a temperature downstream of the cylinder of an internal combustion engine. In particular, the exhaust temperature can be a temperature between the cylinder and the turbine, further preferably, downstream of the turbine. For example, the exhaust temperature may be a temperature of the exhaust aftertreatment system and/or the turbine outlet guide. Preferably, the temperature upstream of the turbine is an exhaust temperature and the temperature downstream of the turbine is a turbine outlet temperature.

Preferably, the exhaust mass flow is the flue gas provided by the cylinders. In particular, the exhaust mass flow is the flow of combustion gas, preferably at least consisting of a fuel flow and an air flow. In particular, the exhaust mass flow is the mass of exhaust gases emitted from the cylinders per time. Further preferably, the exhaust mass flow is the exhaust flow from the cylinder. Further preferably, the exhaust mass flow is determined downstream of the turbine, particularly, between the turbine and an exhaust aftertreatment system. Most preferably, the exhaust mass flow is determined at or inside of the turbine outlet guide.

Preferably, the exhaust manifold pressure is the pressure of the flue gas provided by the cylinders. Further preferably, the exhaust manifold pressure is the pressure downstream of the cylinder, for example, between the cylinder and the turbine and/or between the turbine and the exhaust aftertreatment system, for example inside of the turbine outlet guide. In particular, the exhaust manifold pressure is the pressure of the exhaust flow.

Preferably, the exhaust power is the power of an exhaust mass flow, particularly of the flue gas. Further preferably, the exhaust power is the power of the exhaust mass flow. In particular, the exhaust power is a heat flow of the exhaust mass flow. Preferably, the exhaust power is approximately a product of a specific thermal capacity, an exhaust mass flow and an exhaust temperature value with regards to a reference temperature value. In particular, the target exhaust power to be determined depends, for example, on the type of the internal combustion engine, such as its size, and/or a load point and/or an ambient temperature value and/or an engine coolant temperature value.

Preferably, the specific thermal capacity is calculated in a test bed environment based upon conditions for the load point, for example an exhaust mass flow composition. For example, an ambient temperature value of 25° C. may be a preferred reference temperature value. It is to be understood that the value of the specific thermal capacity may vary in an operation mode of the internal combustion engine. Preferably, the specific thermal capacity may be a generic value in the operation mode of the internal combustion engine. Further preferably, the specific thermal capacity may be determined independent of a reference temperature. Further preferably, an exhaust power value may be determined based upon an exhaust temperature value and/or an exhaust mass flow value or vice versa.

In one situation, for example at an ambient temperature value of for example about 25° C. and after a cold start and/or a low engine load, an increased exhaust power, for example about 35 kW, can be needed. Preferably, an adjustable exhaust flow restriction element is controlled to reduce the exhaust flow guided through an exhaust guide increasing a current exhaust manifold pressure value and a pumping work value. Preferably, an engine load value is kept constant by increasing injected fuel to compensate for the higher pumping work. In some load points, it may be preferred that the adjustable exhaust flow restriction element is controlled to reduce the exhaust flow area and, yet, to increase the exhaust flow with regards to the mass flow providing a higher exhaust power. Thus, preferably, a fuel flow to a cylinder has to be increased to maintain a constant brake torque. Further preferably, an increasing fuel flow increases a rotational speed of a turbo charger, increases an air flow, increases a compression of the air flow, and/or increases an exhaust mass flow. Thus, preferably, a cylinder of an internal combustion engine may be provided with a higher air flow to fuel flow ratio. In a particularly appropriate manner, such a higher air flow to fuel flow ratio may reduce an exhaust temperature value. Advantageously, the adjustable air flow restriction element may be controlled to reduce the air flow to achieve or approach a determined target exhaust mass flow value and/or a determined target exhaust temperature value. Preferably, the adjustable air flow restriction element may be controlled to reduce the air flow by reducing the rotational speed of the turbo charger and, thus, to achieve or approach a determined target exhaust mass flow value and/or a determined target exhaust temperature value.

In another situation, for example, at an ambient temperature value of approximately about 25° C., and an already warmed up internal combustion engine and/or an already warmed up exhaust aftertreatment system, reduced emissions may be realized by controlling the internal combustion engine, in particular, by controlling the exhaust flow and the air flow differently. If the exhaust power has already reached or is about to reach or approach a determined target exhaust power value, e.g. 25 kW, the internal combustion engine can mainly or solely be controlled via the adjustable air flow restriction element. Preferably, as a current exhaust temperature value approaches or reaches a determined target exhaust temperature value, the internal combustion engine may preferably be controlled by means of the adjustable air flow restriction element, wherein the adjustable exhaust flow restriction element is most preferably maintained in or set to a determined position to provide a determined exhaust flow. In particular, the adjustable exhaust flow restriction element may be maintained in or set to a determined position to provide an exhaust flow close to its maximum or to its maximum. Controlling the exhaust flow and the air flow and, thus, the air flow mainly by means of the adjustable air flow restriction element is in particular suitable to decrease emissions of a vehicle at a higher ambient temperature value and/or an already warm exhaust aftertreatment system.

The engine operation parameters and/or the exhaust performance parameters are particularly suitable for depicting the condition of an internal combustion engine with sufficient accuracy for controlling the internal combustion engine, in particular the air flow and/or the exhaust flow. Further preferably, these engine operation parameters and/or exhaust performance parameters are particularly suitable for controlling a temperature of an exhaust aftertreatment system. Most preferably, the condition of an internal combustion engine is depicted based on at least an engine speed value and an engine load value. Most preferably, the condition of an exhaust mass flow is depicted based on at least an exhaust temperature value and/or an exhaust mass flow value. These engine operation parameter values and/or exhaust performance parameter values can be easily determined, which is why they are particularly suitable for controlling an internal combustion engine, in particular controlling an air flow and/or an exhaust flow.

According to one embodiment, the method further comprises the step of determining a current exhaust performance parameter value. Depending on a deviation of the determined current exhaust performance parameter value from the determined target exhaust performance parameter value, the air flow through the air guide is controlled. Further preferably, depending on a deviation of the determined current exhaust performance parameter value from the determined target exhaust performance parameter value, the exhaust flow through the exhaust guide is controlled.

Preferably, current values for two or a plurality of three or more exhaust performance parameters, in particular different exhaust performance parameters, are determined. In this way, a more detailed control can be realized. Preferably, a determined current exhaust performance parameter value is a current value at a certain instance in time. In particular, a determined current exhaust performance parameter value can represent an actual condition or state of the internal combustion engine with regards to at least one exhaust performance parameter.

A determined current exhaust performance parameter value may be supposed to reach or approach a determined target exhaust performance parameter value. The determined current exhaust performance parameter value may change depending on the engine operation parameter value, the air flow and the exhaust flow. The determined current exhaust performance parameter value may be used to control the internal combustion engine. In particular, determining the current exhaust performance parameter value may include the step of calculating and/or estimating and/or measuring the current exhaust performance parameter value. In particular, determining the current exhaust performance parameter value may comprise measuring and/or calculating and/or estimating an exhaust temperature value and/or an exhaust mass flow or an exhaust manifold pressure value.

Preferably, the internal combustion engine comprises at least one corresponding sensor to measure the respective current exhaust performance parameter value(s). To make use of the determined current exhaust performance parameter value for controlling the internal combustion engine, the method can comprise the step of storing a determined current exhaust performance parameter value(s). Determining a deviation value may comprise the steps of measuring and/or calculating and/or estimating the deviation value.

Controlling the air flow through the air guide and/or the exhaust flow through the exhaust guide preferably depends on a deviation of a determined current exhaust performance parameter value from a determined target exhaust performance parameter value. Preferably, the method may comprise the step of determining a deviation of a determined current exhaust performance parameter value from a determined target exhaust performance parameter value providing a determined deviation value. Depending on the determined deviation value an internal combustion engine, in particular an air flow and/or exhaust flow, can be controlled, preferably controlled closed loop. Preferably, the method may comprise the step of storing the determined deviation value.

Preferably, the determined deviation value may be decoded into a value of an air flow control signal to control the air flow and into a value of an exhaust flow control signal to control the exhaust flow. Thus, the method may comprise the step of decoding the determined deviation value into a respective flow control signal value, in particular, to control the respective adjustable flow restriction element. Preferably, a respective decoded flow control signal value is decoded according to a control range or operating range of a respective adjustable flow restriction element.

In particular, in case the determined deviation value is not equal to zero, the respective flow may be adjusted, preferably via at least one respective adjustable flow restriction element. In particular, only the air flow may be adjusted and the exhaust flow is maintained or vice versa. In case an air flow or exhaust flow is maintained, the respective flow does not change, in the sense that no adjustment is made for a specific deviation value. Preferably, if the determined deviation value is not equal to zero controlling the respective flow may comprise the steps of increasing and/or decreasing and/or maintaining the respective flow. In particular, if the deviation value is zero, controlling the air flow and/or the exhaust flow may comprise the step of maintaining the respective flow, in particular, the respective adjustable flow restriction element in a current or previous setting or position.

Preferably, for controlling an internal combustion engine to reach or approach a desired condition, the air flow is controlled depending on a determined deviation value and the exhaust flow is controlled depending on a determined target exhaust performance parameter value. Further preferably, for controlling an internal combustion engine to reach or approach a desired condition, the air flow is controlled depending on a determined target exhaust performance value and the exhaust flow is controlled depending on a determined deviation value. Most preferably, for controlling an internal combustion engine in order to reach or approach a desired condition, both the air flow and the exhaust flow are controlled depending on a determined deviation value.

The preferred embodiment of the method as described herein has the advantage to increase the reaction speed of controlling, by controlling the air flow and/or the exhaust flow depending on the deviation of the determined current exhaust performance parameter value from the determined target exhaust performance parameter value. Controlling the exhaust flow between the cylinder and the turbine further has the advantage to increase the accuracy and reliability of controlling the internal combustion engine. This allows to quickly adapt the exhaust power of the internal combustion engine, to quickly heat up the exhaust aftertreatment system and, thus, to reduce emissions in an advantageous way.

According to a further embodiment, the method further comprises the step of determining an engine speed value and/or determining an engine load value. Further, the method comprises the step of determining the target exhaust performance parameter value depending on the determined engine speed value and/or the determined engine load value.

Advantageously, this preferred embodiment makes use of engine operation parameters, namely engine speed and/or engine load. Since these engine operation parameters are usually already determined, e.g. for another purpose, the internal combustion engine can be controlled quickly and efficiently. This synergetic approach enables to control the internal combustion engine in a cost-efficient way, however, still realizing a further improved reduction of emissions. Further, these engine operation parameters are particularly advantageous since they can be used directly to determine the condition of the internal combustion engine and, in particular, the exhaust performance parameter. Particularly, the engine speed and the engine load influence the combustion stroke and, thus, the exhaust mass flow. In particular, such engine operation parameters are advantageously considered that influence the operating temperature of the exhaust aftertreatment system.

According to a further embodiment, the method further comprises the step of determining a coolant temperature value and/or determining an ambient temperature value and/or determining an exhaust temperature value. Further, the method comprises the step of choosing a value map for determining the target exhaust performance parameter value depending on the determined coolant temperature value and/or the determined ambient temperature value and/or the determined exhaust temperature value. Further preferably, the method further comprises the step of determining the target exhaust performance parameter value depending on the determined coolant temperature value and/or the determined ambient temperature value and/or the determined exhaust temperature value.

Determining a respective temperature value may comprise measuring and/or calculating and/or estimating a respective temperature value. In particular, the method may further comprise the step of storing the determined respective temperature value.

Preferably, determining a target exhaust performance parameter value may comprise choosing and using a value map. Preferably, a value map is a characteristics diagram, e.g. a two- or more-dimensional table, containing values of different parameters, in particular of at least one engine operation parameter and at least one exhaust performance parameter. Starting from the determined engine operation parameter value(s), an associated target exhaust performance parameter value can be identified in the diagram. Different value maps may be provided for different ambient temperature values and/or different engine coolant temperature values. In particular, such a value map may comprise target exhaust performance parameter values associated to values of the engine operation parameters engine speed and engine load. Preferably, starting from the determined engine speed value and/or determined engine load value, an associated target exhaust performance parameter value can be identified in the diagram. In particular, starting from the determined engine speed value and/or determined engine load value, an associated target exhaust temperature value and/or target exhaust mass flow value and/or target exhaust manifold pressure value can be identified in the diagram. A value map or a set of value maps may be specified in a test bed.

A value map, in particular its characteristics diagram, may also comprise respective flow control signal values, in particular, in addition to or instead of target exhaust performance parameter values. For example, starting from the determined engine operation parameter value(s), an associated target exhaust performance parameter value can be identified in the diagram, as well as associated respective flow control signal values. Further preferably, the value map or a set of value maps may be specified taking target exhaust performance parameter values into consideration and directly associating respective flow control signal values to the determined engine operation parameter value(s). In this way, starting from the determined engine operation parameter value(s), the associated respective flow control signal values can be directly identified in the diagram.

Further preferably, determining a deviation of a determined current exhaust performance parameter value from a determined target exhaust performance parameter value may comprise using a value map. Preferably, such a value map may comprise exhaust performance parameter values and target exhaust performance parameter values, in particular, deviation values from the determined current exhaust performance parameter value from the target exhaust performance parameter value. Further in particular, such a value map comprises respective flow control signal values. Starting from a determined target exhaust performance parameter value and a determined current exhaust performance parameter value a deviation value can be determined in the diagram. In particular, depending on the determined deviation value, associated exhaust flow control signal values and/or air flow control signal values can be identified in the diagram. Different value maps may be provided for different ambient temperature values and/or different engine coolant temperature values. Such a value map or a set of value maps may be specified in a test bed.

In particular, depending on the determined coolant temperature value a value map for determining the target exhaust performance parameter value may be chosen. Further preferably, for determining the target exhaust performance parameter value a value map may be chosen depending on the determined ambient temperature value. Further preferably, for determining the target exhaust performance parameter value a value map may be chosen depending on the determined exhaust temperature value.

Advantageously, this preferred embodiment allows to quickly and easily determine the desired target exhaust performance value, which allows controlling the internal combustion engine in such a manner that the target exhaust performance value is quickly reached or approached and the emissions are quickly reduced, in particular after cold starts and/or at a low ambient temperature value. Further, particularly the coolant temperature and/or the ambient temperature are engine operation parameters that are usually already determined, e.g. for another purpose, thus, enabling to quickly and efficiently control the internal combustion engine. In particular, they can easily be taken into account to control the internal combustion engine. Further preferably, since the control unit already provides a value map and/or a set of value maps, thus, already provides information about dependencies between different parameters, it allows to easily and quickly access relevant values to control the internal combustion engine efficiently.

According to a further embodiment, the method further comprises the step of transforming a determined target exhaust power value to a target exhaust temperature value. Further preferably, the method further comprises the step of transforming a determined target exhaust power value to a target exhaust mass flow value.

Further preferably the method may comprise the steps of determining a target exhaust power value and transforming a determined target exhaust power value to a target exhaust manifold pressure value.

Preferably, the step of transforming comprises the steps of recalculating and/or converting and/or translating and/or dividing and/or splitting and/or portioning. In particular, the step of transforming comprises to transform a value into at least two values. Preferably, the determined exhaust power value is transformed into an exhaust temperature value and/or an exhaust mass flow value. Further preferably, the determined exhaust power value is transformed into an exhaust manifold pressure value. Particularly, the exhaust temperature value and/or the exhaust mass flow value and/or the exhaust manifold pressure value are particularly suitable for use as parameters for controlling an internal combustion engine. Preferably, transforming the desired target exhaust power value into a target exhaust temperature value and/or a target exhaust mass flow value is based on an isobaric process. Further preferably, transforming the desired target exhaust power value into a target exhaust temperature value and/or a target exhaust mass flow value is based on an isochoric process. Transforming may comprise measuring and/or calculating and/or estimating. In particular, the step transforming is based on the preferred dependency between an exhaust power that is approximately a product of a specific thermal capacity, an exhaust mass flow and an exhaust temperature value with regards to a reference temperature value as described above.

Preferably, the target exhaust power value is transformed into a target exhaust temperature value if the exhaust mass flow value and the turbine outlet temperature value are known. Further preferably, the target exhaust power value is transformed into a target exhaust mass flow value if the exhaust temperature value and the turbine outlet temperature value are known.

For example, considering a certain type of an internal combustion engine that is already heated up and an ambient temperature value of about 25° C., a target exhaust power of about 25 kW may be determined using a value map based, for example, on a determined engine speed value of 1000 rpm and a determined engine load value of 400 Nm. Such a determined target exhaust power may further depend on the type of the internal combustion engine and other parameters. The target exhaust power value may be transformed into a target exhaust mass flow and/or target exhaust temperature value. Transforming the determined 25 kW target exhaust power value into a target exhaust mass flow and/or target exhaust temperature value may provide, for example, an exhaust mass flow of about 0.09 kg per second and/or an exhaust temperature value of about 290° C.

For example, considering a certain type of an internal combustion engine after a cold start and an ambient temperature value of about 25° C., a target exhaust power of about 35 kW may be determined using a value map based, for example, on a determined engine speed value of 1000 rpm and a determined engine load value of 400 Nm. Again, it is to be understood that such a determined target exhaust power may further depend on the type of the internal combustion engine and other parameters. The target exhaust power value may be transformed into a target exhaust mass flow and/or target exhaust temperature value. Transforming the determined 35 kW target exhaust power value into a target exhaust mass flow and/or target exhaust temperature value may provide, for example, an exhaust mass flow of about 0.1 kg per second and/or an exhaust temperature value of about 350° C.

Preferably, the target exhaust power value is determined based on a value map having engine speed values and engine load values. The determined target exhaust power value is transformed into a target exhaust temperature value and a target exhaust mass flow value. Preferably, the target exhaust power value corresponds to a heat flow required by an exhaust aftertreatment system to quickly reduce emissions, in particular after a cold start and/or low ambient temperatures.

Advantageously, this preferred embodiment allows transforming the desired target exhaust power value into a target exhaust temperature value and/or a target exhaust mass flow value. Controlling the internal combustion engine by means of a target exhaust temperature value and/or a target exhaust mass flow value allows a very direct and precise control of the respective flow in order to quickly heat up an exhaust aftertreatment system. Thus, the method of such a preferred embodiment further improves reduction of emissions of an internal combustion engine after cold starts and/or at low ambient temperatures.

According to a further embodiment, the method further comprises the step of determining a target exhaust temperature value and a target exhaust manifold pressure value. Further, the method further comprises the step of determining a current exhaust temperature value and a current exhaust manifold pressure value. Depending on a deviation of the determined current exhaust temperature value from the determined target exhaust temperature value the air flow is controlled through the air guide. Further, depending on a deviation of the determined current exhaust manifold pressure value from the determined target exhaust manifold pressure value the exhaust flow is controlled through the exhaust guide.

Preferably, the target exhaust manifold pressure and the target exhaust temperature are determined based on value maps depending on engine speed value and an engine load value both to be determined. Further, this embodiment may comprise the step of choosing value maps for determining the target exhaust manifold pressure and the target exhaust temperature depending on a determined coolant temperature.

Determining a target and a current exhaust flow temperature value and a target and a current exhaust manifold pressure value allows controlling an internal combustion engine in a very accurate manner. In particular, delay in controlling is reduced, which allows the internal combustion engine 1 to quickly heat up an exhaust aftertreatment system. Thus, advantageously, such an embodiment of the method further reduces emissions of an internal combustion engine, in particular after cold starts and/or at low ambient temperature values.

According to a further embodiment, the method further comprises the step of controlling a bypass flow through a bypass guide. Preferably, the bypass flow is controlled depending on the determined target exhaust performance parameter value and/or depending on the deviation of the determined current exhaust performance parameter value from the determined target exhaust performance parameter value.

Preferably, the method can be applied to control the internal combustion engine to decrease emissions of internal combustion engines in vehicles. In particular, the method can be applied to further preferably control the bypass flow from the cylinder to quickly heat up an exhaust aftertreatment system.

Preferably, the internal combustion engine can comprise a bypass guide arranged to bypass a bypass flow from the cylinder past the turbine and, in particular, an adjustable bypass flow restriction element arranged to control the bypass flow guided through the bypass guide. In particular, the flue gas that is pushed out of the cylinder providing a flue gas flow can be divided between the exhaust flow and the bypass flow. Thus, preferably, the sum of the exhaust flow and the bypass flow equals the flue gas flow, in particular, with regards to the respective mass flows. The bypass guide may be arranged to bypass part of the flue gas flow as bypass flow past the turbine. Preferably, the bypass guide is arranged to guide the bypass flow from the cylinder past the turbine. More preferably, the bypass guide is arranged to guide the bypass flow from the exhaust guide past the turbine. Particularly, the adjustable bypass flow restriction element is arranged downstream of the cylinder to control the bypass flow guided through the bypass guide. In particular, the adjustable bypass flow restriction element is arranged between the cylinder and an exhaust aftertreatment system, in particular the outlet guide. More preferably, the adjustable bypass flow restriction element is arranged between the adjustable exhaust flow restriction element and the exhaust aftertreatment system, in particular the outlet guide.

Preferably, the adjustable bypass flow restriction element comprises, mutatis mutandis, technical features and/or functionalities corresponding to some or all of the technical features and/or functionalities described above with respect to an adjustable air flow restriction element and/or an adjustable exhaust flow restriction element. In particular, as to the advantages and preferred further details of the method step of controlling a bypass flow, reference is made to the corresponding advantages and preferred further details of the method step with respect to controlling the air flow and/or exhaust flow described above.

By controlling an exhaust flow, a bypass flow and an air flow, the internal combustion engine, in particular, the operating temperature of an exhaust aftertreatment system can be controlled even more precisely and quickly. The method as described herein provides an advantageous solution to decrease the emissions of internal combustion engines in vehicles, especially at low ambient temperatures and/or after a cold start and/or after low load, even further. The method has the advantage, by controlling the air flow, to increase the exhaust power of the internal combustion engine, in particular to heat up the exhaust aftertreatment system more quickly. The present method provides advantages in particular at a low ambient temperature and/or after a cold start and/or after low load. Since the method for controlling an internal combustion engine allows heating up an exhaust aftertreatment system more quickly, emissions can be reduced in an advantageous way.

Furthermore, the method has the advantage to make use of an increased expansion ratio of the turbine, in particular when the adjustable exhaust flow restriction element is arranged between the cylinder and the turbine. The increased expansion ratio enables to increase compression of the air flow and, thus, to increase the air flow. Subsequently, even if the exhaust flow area is reduced by means of the adjustable exhaust flow restriction element the exhaust flow is increased due to the increased air flow. Thus, the exhaust aftertreatment system is provided with a higher exhaust power.

According to a second aspect of the invention, the object is achieved by a computer program according to claim 9. The computer program comprises program code means for performing the steps of the aspect and embodiments of the method described herein when said program is run on a computer.

As to the advantages, preferred embodiments and details of the computer program, reference is made to the corresponding aspect and embodiments of the method described above.

According to a third aspect of the invention, the object is achieved by a computer readable medium according to claim 10. The computer readable medium carries a computer program comprising program code means for performing the steps of the aspect and embodiments of the method described herein when said program product is run on a computer.

As to the advantages, preferred embodiments and details of the computer readable medium, reference is made to the corresponding aspect and embodiments of the method described above.

According to a fourth aspect of the invention, the object is achieved by a control unit according to claim 11. The control unit for controlling an internal combustion engine is configured to perform the steps of the aspect and embodiments of the method described herein.

Preferably, the control unit is adapted to determine a target and current exhaust performance parameter value, an engine operation parameter value and/or deviation of a current exhaust performance parameter value from a target exhaust performance parameter value. In particular, the control unit, is adapted to calculate and/or measure and/or estimate respective values. Preferably, the control unit is adapted to determine and/or generate and/or store a determined target and current exhaust performance parameter value, a determined deviation value and/or a respective flow control signal value.

Preferably, the control unit may be connected to an adjustable exhaust flow restriction element and/or an adjustable bypass flow restriction element and/or an adjustable air flow restriction element by means of a respective flow signal line. Preferably, the control unit is adapted to control the respective flow through the respective guide, in particular by being adapted to control the respective adjustable flow restriction element.

In particular, the control unit may be connected to respective sensors, in particular, a temperature sensor, a pressure sensor, a speed sensor, and/or a torque sensor. Preferably, the control unit is connected to respective sensors via respective signal lines. In particular, the control unit may be adapted to determine and/or store a respective sensor value.

As to the advantages, preferred embodiments and details of the control unit, reference is made to the corresponding aspect and embodiments of the method described above.

According to a fifth aspect of the invention, the object is achieved by an internal combustion engine according to claim 12. Such an internal combustion engine comprises a cylinder and a turbo charger having a compressor and a turbine driving the compressor. Further, an air guide is arranged to guide an air flow from the compressor to the cylinder. Between the compressor and the cylinder an adjustable air flow restriction element is arranged to control the air flow guided through the air guide. Further, an exhaust guide is arranged to guide an exhaust flow from the cylinder to the turbine. Between the cylinder and the turbine an adjustable exhaust flow restriction element is arranged to control the exhaust flow through the exhaust guide. In particular, the internal combustion engine comprises a control unit described herein.

According to one embodiment, an internal combustion engine comprises an exhaust flow temperature sensor arranged downstream of the cylinder. Further, the internal combustion engine can comprise an engine coolant system having a coolant temperature sensor and/or an ambient temperature sensor arranged peripheral to the internal combustion engine. Preferably, the internal combustion engine may comprise an exhaust flow pressure sensor arranged downstream of the cylinder and/or an air flow pressure sensor arranged upstream of the cylinder. Preferably, the internal combustion engine may comprise an engine coolant system having such a coolant temperature sensor. In particular, the internal combustion engine comprises a speed sensor adapted to determine an engine speed value. Further preferably, the internal combustion engine comprises a torque sensor adapted to determine the engine load. Further preferably, the internal combustion engine described herein comprises an exhaust aftertreatment system.

The invention also relates to a vehicle comprising an internal combustion engine described herein. Preferably, the vehicle described herein has an exhaust aftertreatment system.

As to the advantages, preferred embodiments and details of the internal combustion engine and of the vehicle, reference is made to the corresponding aspects and embodiments of the method described above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
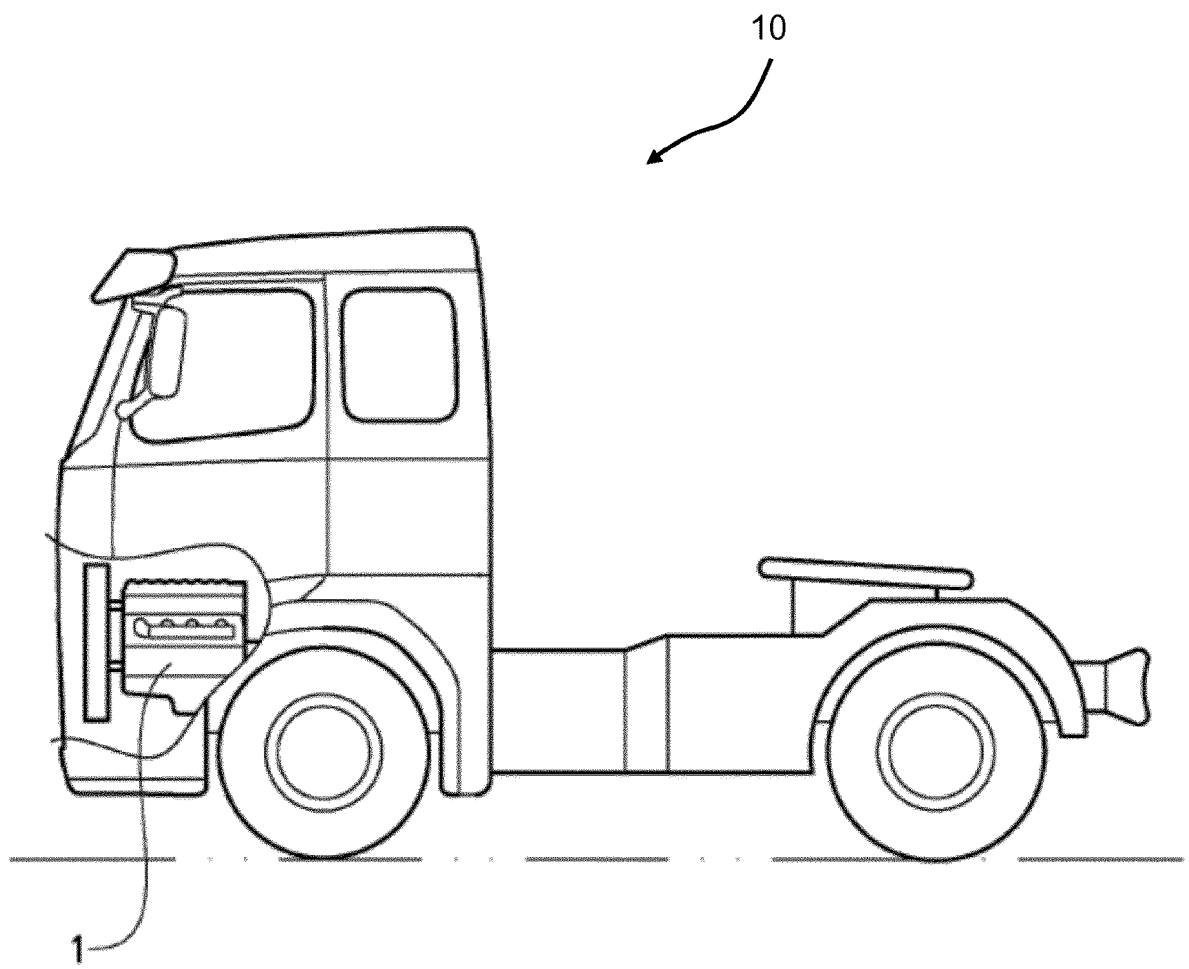
FIG. 1 is a side view of a vehicle in the form of a truck.

FIG. 1 shows a vehicle 10 in the form of truck or a tractor for a semitrailer. Further preferably, such a vehicle 10 can be a car, a bus or a working machine. The vehicle 10 comprises an internal combustion engine 1, particularly a four-stroke internal combustion engine 1. Further preferably, not shown in FIG. 1, the vehicle 10 may comprise an exhaust aftertreatment system 8 that is connected with the internal combustion engine 1.

Figure 2:
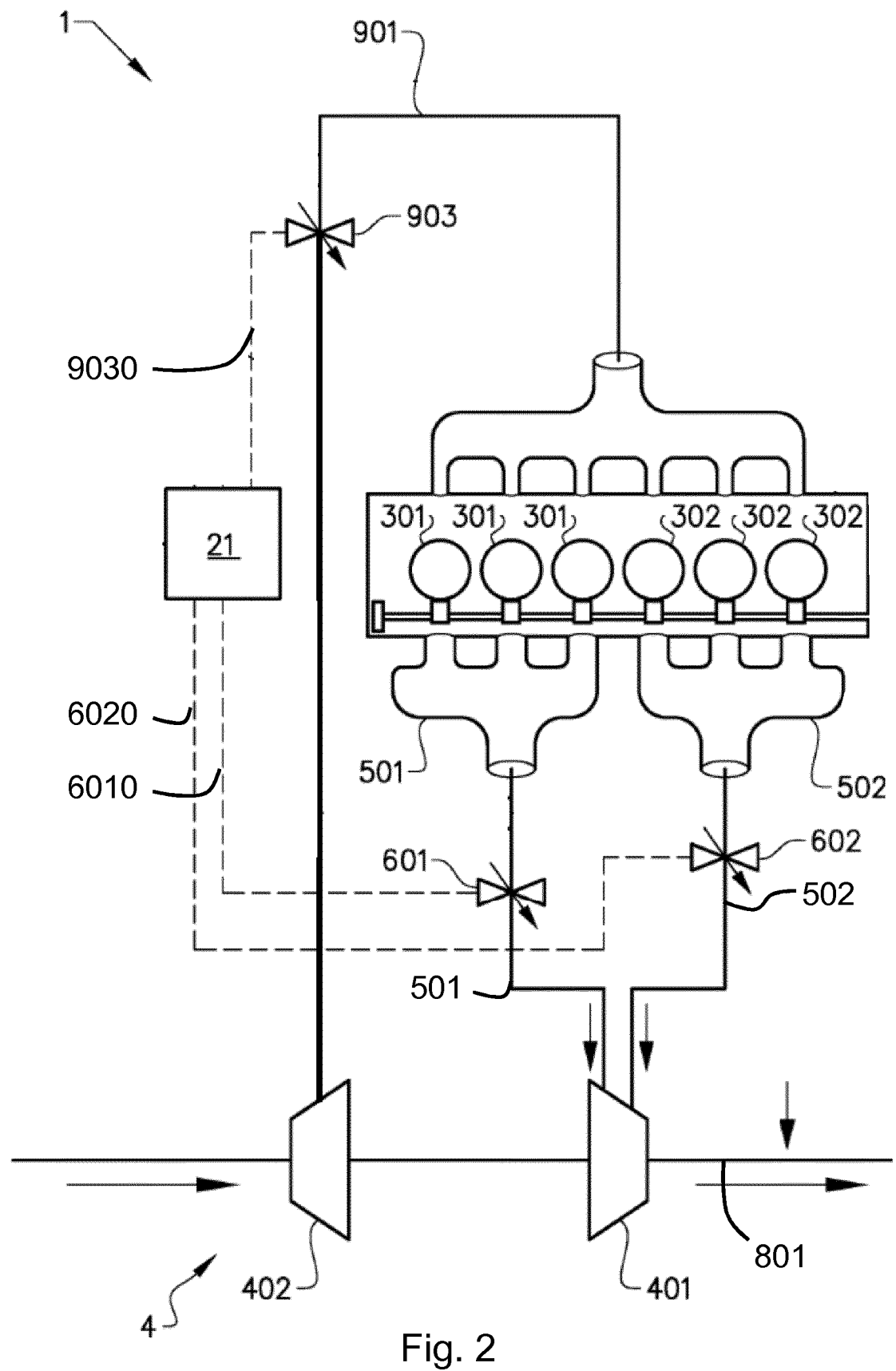
FIG. 2 is a schematic drawing of an example embodiment of an internal combustion engine in the vehicle in FIG. 1.
Figure 3:
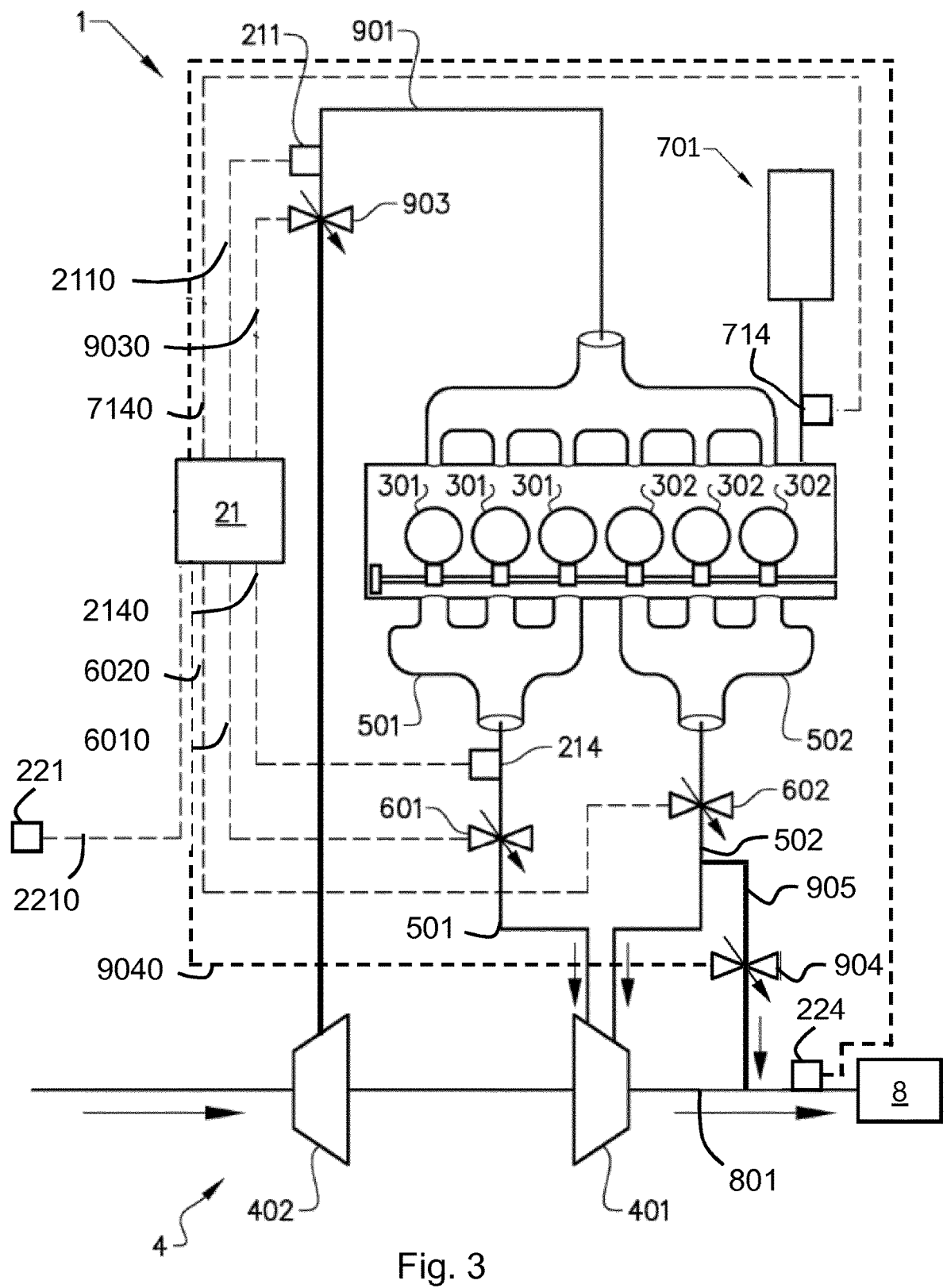
FIG. 3 is a schematic drawing of a further example embodiment of an internal combustion engine.

FIGS. 2 and 3 show schematic drawings of possible example embodiments of an internal combustion engine 1. However, the internal combustion engine 1 claimed herein shall not be restricted or limited to the provided example embodiments of the internal combustion engines. In particular, further embodiments of the internal combustion engine 1 may be a combination of shown example embodiments of the internal combustion engine 1 below and/or may not include certain features of the shown example embodiments of the internal combustion engine.

FIG. 2 shows a basic embodiment of the internal combustion engine 1 being provided in a vehicle such as shown in FIG. 1. Thereby, cylinders 301, 302 are provided with an air flow via an air flow guide 901. In particular, the present embodiment has a turbocharger 4 comprising a compressor 402 compressing the air flow and a turbine 401 driving that compressor 402. The turbine 401 and the compressor 402 are arranged on a joint shaft to drive the compressor 402. Further preferably, not shown, the temperature of an air flow may be controlled by means of an engine charge air cooler. An exhaust flow is provided from the cylinders 301, 302 to the turbine 401 via exhaust guides 501, 502. In the depicted example, two exhaust guides 501, 502 are shown. However, the exhaust flow provided from the cylinders 301, 302 can also be guided through a single exhaust guide or three or more exhaust guides. The exhaust flow passes through the turbine 401 and expands. By expanding the exhaust flow the turbine 401 is driven. The expanded exhaust flow may be guided through a turbine outlet guide 801 that is arranged downstream of the turbine 401. Preferably, the internal combustion engine 1 comprises an adjustable air flow restriction element 903 and an adjustable exhaust flow restriction element 601, 602 that are adapted to control the respective flows guided through the respective guides 501, 502, 901.

According to the embodiment in FIG. 2, the internal combustion engine 1 comprises a control unit 21 that is adapted to control the adjustable air flow restriction element 903, and to control the adjustable exhaust flow restriction elements 601, 602 by means of signal lines 6010, 6020, 9030. Particularly, the adjustable air flow restriction element 903 and the adjustable exhaust flow restriction elements 601, 602 are continuously adjustable. In particular, the control unit 21 is adapted to provide an air flow control signal value to control the adjustable air flow restriction element 903 via signal line 9030. Further preferably, the control unit 21 is adapted to provide an exhaust flow control signal value to control the adjustable exhaust flow restriction elements 601, 602 via signal lines 6010, 6020. Preferably, the respective control signals are electric and/or pneumatic signals.

Based on the example embodiment shown in FIG. 2 a further preferred example embodiment shown in FIG. 3 depicts an internal combustion engine 1 further comprising an adjustable bypass restriction element 904 to control a bypass flow. Preferably, the bypass flow is guided through a bypass guide 905 arranged to bypass the turbine. In this preferred example embodiment, the bypass guide is arranged downstream of the cylinder 301, 302 to connect exhaust guide 502 and a turbine outlet guide 801. For example, the turbine outlet guide 801 is arranged between the turbine 401 and an exhaust aftertreatment system 8. The adjustable bypass flow restriction element 904 is adapted to increase, decrease and/or maintain the bypass flow guided through the bypass guide 905. In particular, the adjustable bypass flow restriction element 904 is arranged inside of or at the bypass guide 905. Particularly, the adjustable bypass flow restriction element 904 is continuously adjustable. In particular, the internal combustion engine 1 has a further signal line 9040 that is arranged to connect the control unit 21 with the adjustable bypass flow restriction element 904.

Preferably, the internal combustion engine 1 comprises an air flow pressure sensor 211 arranged at the air guide 901 upstream of the cylinders 301, 302. The air flow pressure sensor 211 is adapted to determine a current air flow pressure value of the air flow guided through the air guide 901. The internal combustion engine 1 also comprises an exhaust flow pressure sensor 214 arranged at the exhaust guides 501, 502 to determine an exhaust manifold pressure value of the exhaust flow guided through the exhaust guides 501, 502.

Further preferably, the internal combustion engine 1 comprises an exhaust flow temperature sensor 224 preferably arranged between the turbine 401 and an exhaust aftertreatment system 8. The exhaust flow temperature sensor 224 is adapted to determine a current exhaust flow temperature value of a flue gas guided through the respective guide 801. Further preferably, the internal combustion engine 1 comprises an engine coolant system 701 having a coolant temperature sensor 714. Preferably, the coolant temperature sensor 714 is arranged to determine a current coolant temperature value of the internal combustion engine 1. Further preferably, the internal combustion engine 1 comprises an ambient temperature sensor 221. Preferably, the ambient temperature sensor 221 is arranged to determine a current ambient temperature value. Preferably, the ambient temperature sensor 221 is arranged outside of the cylinders 301, 302. Most preferably, the ambient temperature sensor is thermally disconnected from the cylinders 301, 302 and arranged to determine a current ambient temperature value of an ambient surrounding a vehicle 10.

According to the embodiment in FIG. 3, preferably, the internal combustion engine 1 comprises a control unit 21 that is adapted to control the air flow, particularly the adjustable air flow restriction element 903. In particular, the control unit 21 is adapted to provide an air flow control signal value to control the adjustable air flow restriction element 903 via signal line 9030. Further preferably, the control unit 21 is adapted to determine the current air flow pressure value via the air flow pressure sensor 211 and to determine the current exhaust manifold pressure value via the exhaust flow pressure sensor 214.

Particularly, the internal combustion engine 1 has further signal lines 2110, 2140 that are arranged to connect the control unit 21 with the air flow pressure sensor 211 and the exhaust flow pressure sensor 214. Preferably, an exhaust flow pressure sensor 214 may be associated to an exhaust guide 501. Further preferably, an exhaust flow pressure sensor 214 may be associated to exhaust guides 501, 502. Further preferably, the control unit 21 is adapted to determine the current exhaust flow temperature value by an exhaust flow temperature sensor 224. Further preferably, the control unit 21 is adapted to determine the current coolant temperature value by a coolant temperature sensor 714. Further preferably, the control unit 21 is adapted to determine the current ambient temperature value by an ambient temperature sensor 221. Particularly, the internal combustion engine 1 has signal lines 2110, 2140, 2210, 2240, 7140 that are arranged to connect the control unit 21 with the respective sensors 211, 214, 221, 224, 714. Preferably, the respective control signals and/or sensor signals are electric and/or pneumatic signals.

Preferably, the control unit 21 is adapted to control the air flow and/or the exhaust flow and/or the bypass flow depending on a determined current air flow pressure value and/or a determined current exhaust manifold pressure value.

In particular, preferred embodiments of the internal combustion engine 1 can comprise any combination of introduced adjustable restriction elements 601, 602, 903, 904 and/or any combination of sensors 211, 214, 221, 224, 714. Further preferably, the control unit is adapted to control the air flow and/or the exhaust flow and/or the bypass flow to quickly reach a determined target exhaust performance parameter value.

Figure 4:
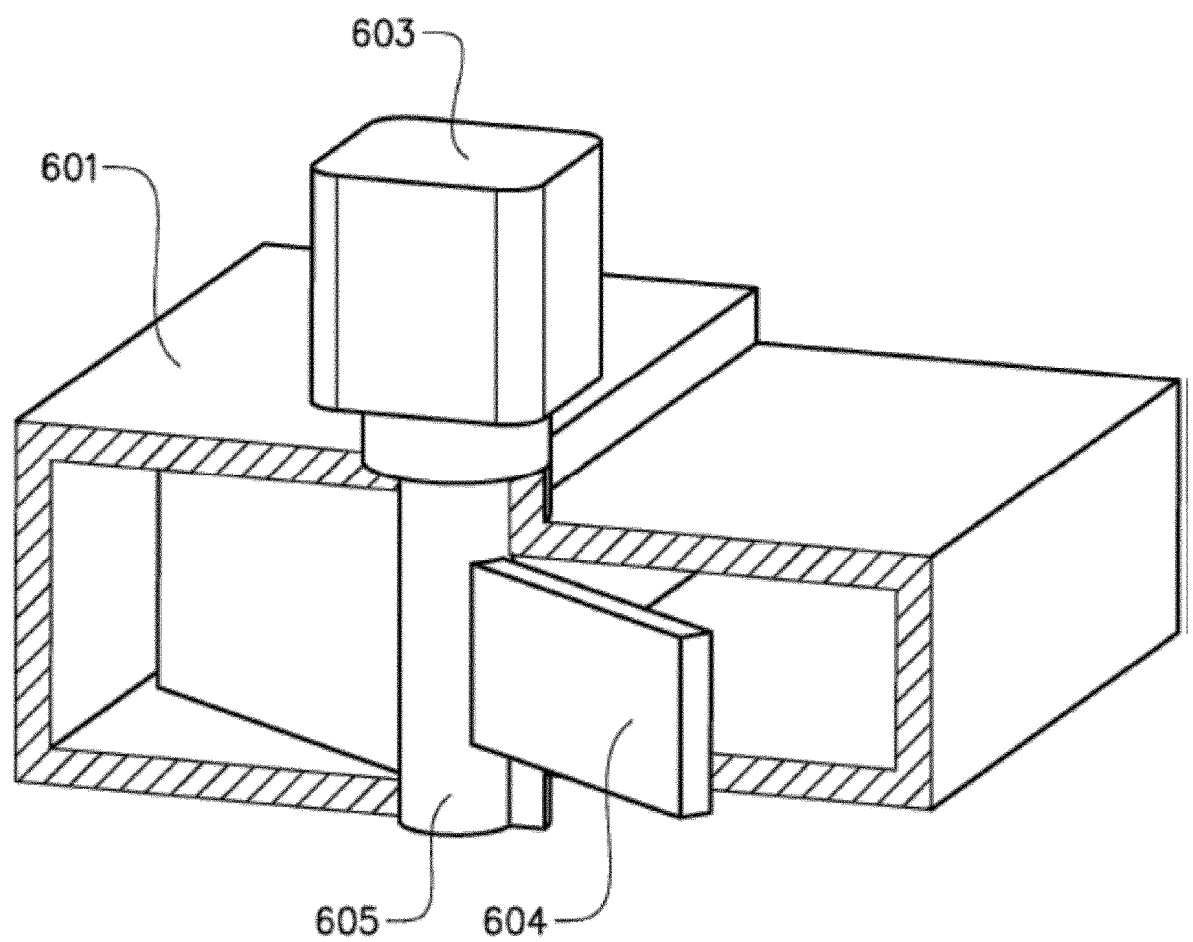
FIG. 4 is a schematic drawing of an example embodiment of an exhaust flow restriction element for an internal combustion engine as shown in FIG. 2-3.

FIG. 4 shows an example embodiment of an adjustable exhaust flow restriction element 601 of an internal combustion engine 1. Such an example embodiment of the adjustable exhaust flow restriction element 601 may be provided in one of the example embodiments of internal combustion engines 1 introduced in FIGS. 2 to 3. The shown adjustable exhaust flow restriction element 601 is a butterfly valve with a flap 604. The butterfly valve may comprise an exhaust flow restriction actuation assembly 603 with a stepper motor, a brushless motor or a pneumatic motor. Preferably, the exhaust flow restriction actuation assembly 603 is provided to adjust the adjustable exhaust flow restriction element 601, i.e. to adjust an angular position of the flap 604 around an axle 605 in order to adjust the exhaust flow area. The flap 604 is non-symmetric, i.e. the extension of the flap is larger on one side of the axle 605 than on the other side. As a result, the adjustable exhaust flow restriction element 601 is arranged to assume, upon a fault in the exhaust flow restriction actuation assembly 603, a position in which the adjustable exhaust flow restriction element 601 does not restrict or block or limit the flow through the exhaust guide 501. Preferably, the exhaust flow restriction actuation assembly 603 is adapted to be controlled by means of an exhaust flow control signal value. The adjustable air flow restriction element 903 and/or the adjustable bypass flow restriction element 904 may be designed, mutatis mutandis, accordingly.

FIGS. 5 to 10 are schematic block diagrams depicting steps in preferred example embodiments of a method for controlling an internal combustion engine 1, such as shown in FIGS. 2 and 3, in a vehicle 10, such as shown in FIG. 1. However, the method for controlling the internal combustion engine 1 claimed herein shall not be restricted or limited to the provided example embodiments of the method. In particular, further embodiments of the method may be a combination of shown example embodiments of the method below and/or may not include certain steps of the shown example embodiments of the method.

Figure 5:
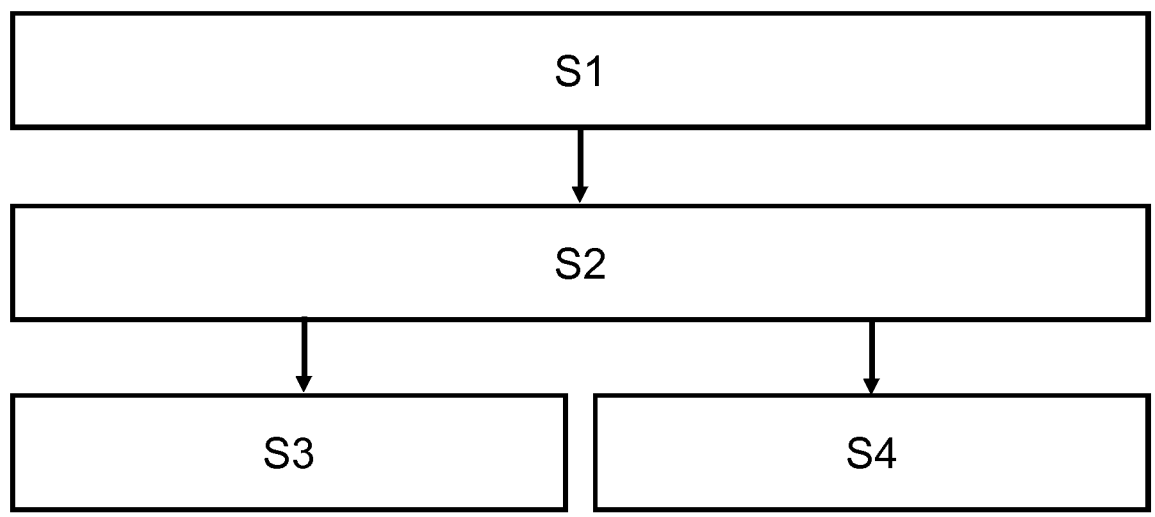
FIG. 5 is a schematic block diagram depicting steps in an example embodiment of a method for controlling the internal combustion engine in the vehicle in FIG. 1.

In FIG. 5 is a schematic block diagram depicting steps in a preferred example embodiment of a method for controlling the internal combustion engine 1. Particularly, this preferred embodiment of the method comprises four steps: determining a value of at least one engine operation parameter S1, determining a target value of an exhaust performance parameter depending on the determined engine operation parameter value S2, and controlling an air flow through the air guide 901 depending on the determined target exhaust performance parameter value S3, and controlling the exhaust flow through an exhaust guide 501, 502 depending on the determined target exhaust performance parameter value S4.

Figure 12:
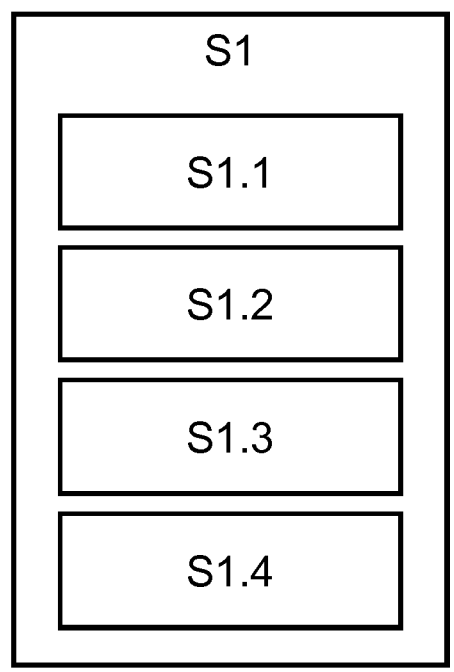
FIG. 12 is a schematic block diagram depicting detailed example steps to determine at least one engine operation parameter value.

FIG. 12 is a schematic block diagram depicting detailed example steps to determine at least one engine operation parameter value. In particular, determining the value of at least one engine operation parameter S1 may comprise the steps of determining an engine speed value S1.1, and/or determining an engine load value S1.2, and/or determining a coolant temperature value S1.3, and/or determining an ambient temperature value S1.4. Further preferably, the at least one engine operation parameter is an air flow temperature and/or an air flow pressure. In particular, determining the engine speed value S1.1 comprises the step of measuring the engine speed value by means of a rotational speed sensor being provided to measure the rotational speed of a crankshaft of the cylinders 301, 302. Further preferably, determining the engine load value comprises the step of calculating the engine load value based on a provided air flow and a provided fuel flow for a combustion stroke of a cylinder 301, 302.

Figure 13:
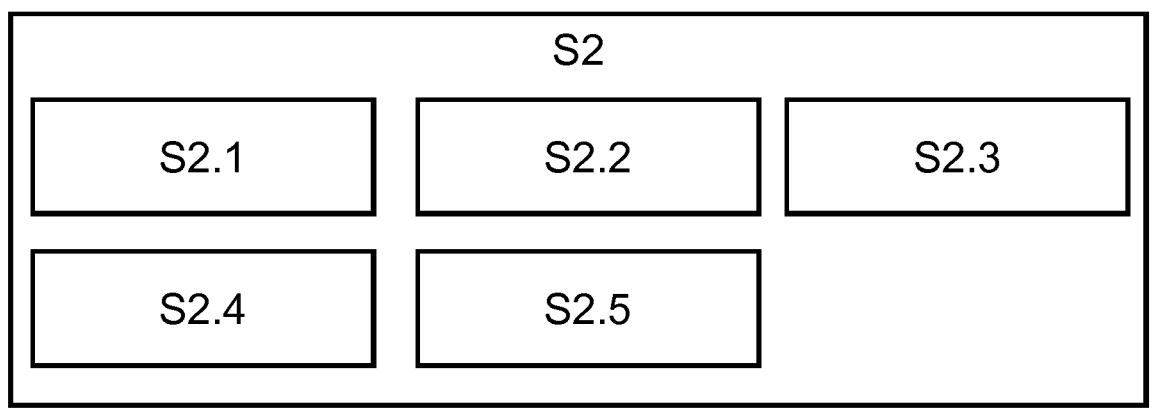
FIG. 13 is a schematic block diagram depicting detailed example steps to determine a target exhaust performance parameter value.

FIG. 13 is a schematic block diagram depicting detailed example steps to determine at least one target exhaust performance parameter value. In particular, determining at least one target exhaust performance parameter value S2 may comprise the steps of determining a target exhaust temperature value S2.1 and/or determining a target exhaust mass flow value S2.2 and/or determining a target exhaust manifold pressure value S2.3. Further preferably, the step of determining a target exhaust performance parameter value may comprise the step of determining a target exhaust power value S2.4. In particular, if a target exhaust power value is determined S2.4, determining a target exhaust performance parameter value further comprises the step of transforming a target exhaust power value to a target exhaust temperature value and/or to a target exhaust mass flow value S2.5. Further preferably, the exhaust performance parameter is a temperature of an expanded exhaust flow downstream of a turbine 401, particularly, guided through a turbine outlet guide 801. Further preferably, an exhaust performance parameter is a temperature of an exhaust aftertreatment system 8. Most preferably, determining a target exhaust performance parameter value S2 comprises determining target values for two or a plurality of three or more exhaust performance parameters, in particular different exhaust performance parameters.

Particularly, a determined target exhaust performance parameter value is a desired state of an internal combustion engine 1 that is supposed to be reached or approached, particularly, to operate an exhaust aftertreatment system 8 in a desired state, preferably at a desired operating temperature. In particular, the determined target exhaust performance parameter value is supposed to be reached or approached by the step of controlling S3 the air flow through the air guide 901 and/or by the step of controlling S4 the exhaust flow through the exhaust guides 501, 502. In particular, a controlled air flow and/or controlled exhaust flow may provide a reduced air flow to the cylinders 301, 302 and/or provide a reduced flue gas flow from the cylinders 301, 302. Further preferably, a controlled air flow and/or controlled exhaust flow may provide reduced respective flows. In particular, controlling the respective flow may depend on certain circumstances and/or situations, such as for certain sets of determined engine operation parameter values and/or determined target exhaust performance parameter values.

Particularly, to control the air flow and/or the exhaust flow the determined target exhaust performance parameter values may be decoded into an air flow control signal value and/or an exhaust flow control signal value. Preferably, the air flow control signal value and/or the exhaust flow control signal value may be provided by means of a control unit 21 to control the adjustable air flow restriction element 903 and/or the adjustable exhaust flow restriction elements 601, 602 to reach or approach the determined target exhaust performance parameter value.

Preferably, in this preferred example embodiment of the method for controlling the internal combustion engine 1, the air flow and/or the exhaust flow may be controlled open loop depending on the determined exhaust performance parameter value(s) and/or the determined engine operation parameter value(s).

Figure 6:
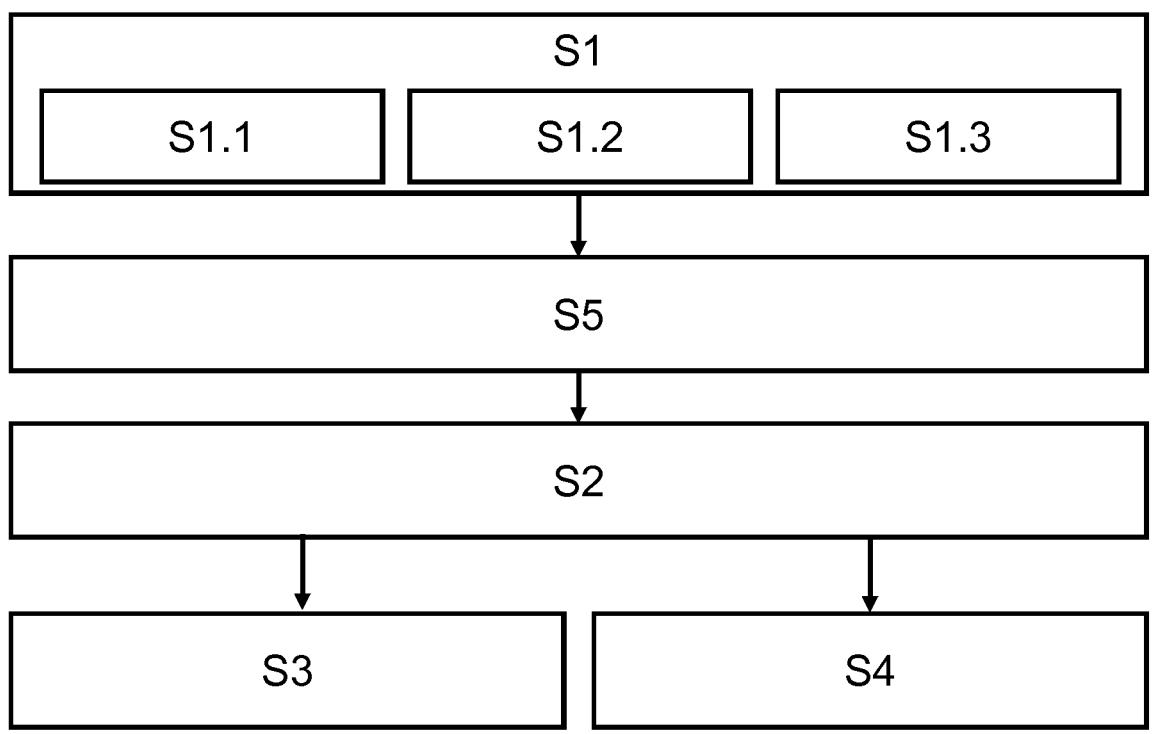
FIG. 6 is a schematic block diagram depicting steps in a further example embodiment of a method for controlling the internal combustion engine.

Thus, based on the example embodiment of a method for controlling the internal combustion engine 1 shown in FIG. 5, the further example embodiment of the method for controlling an internal combustion engine 1, as shown in FIG. 6, further comprises the step of choosing S5 a value map for determining the target exhaust performance parameter value depending on a determined coolant temperature value. In this preferred example embodiment, the step of determining the target exhaust performance parameter value depends on a determined engine speed value S1.1, a determined engine load value S1.2 and a determined coolant temperature value S1.3. Preferably, the set of value maps shown in FIG. 11a may be value maps chosen in the example embodiment shown in FIG. 6. Thus, depending on a determined engine speed value S1.1, a determined engine load value S1.2, and a determined coolant temperature value S1.3 the target exhaust performance parameter value(s) are determined.

Preferably, target exhaust performance parameter values are determined by means of value maps.

Figure 11A:
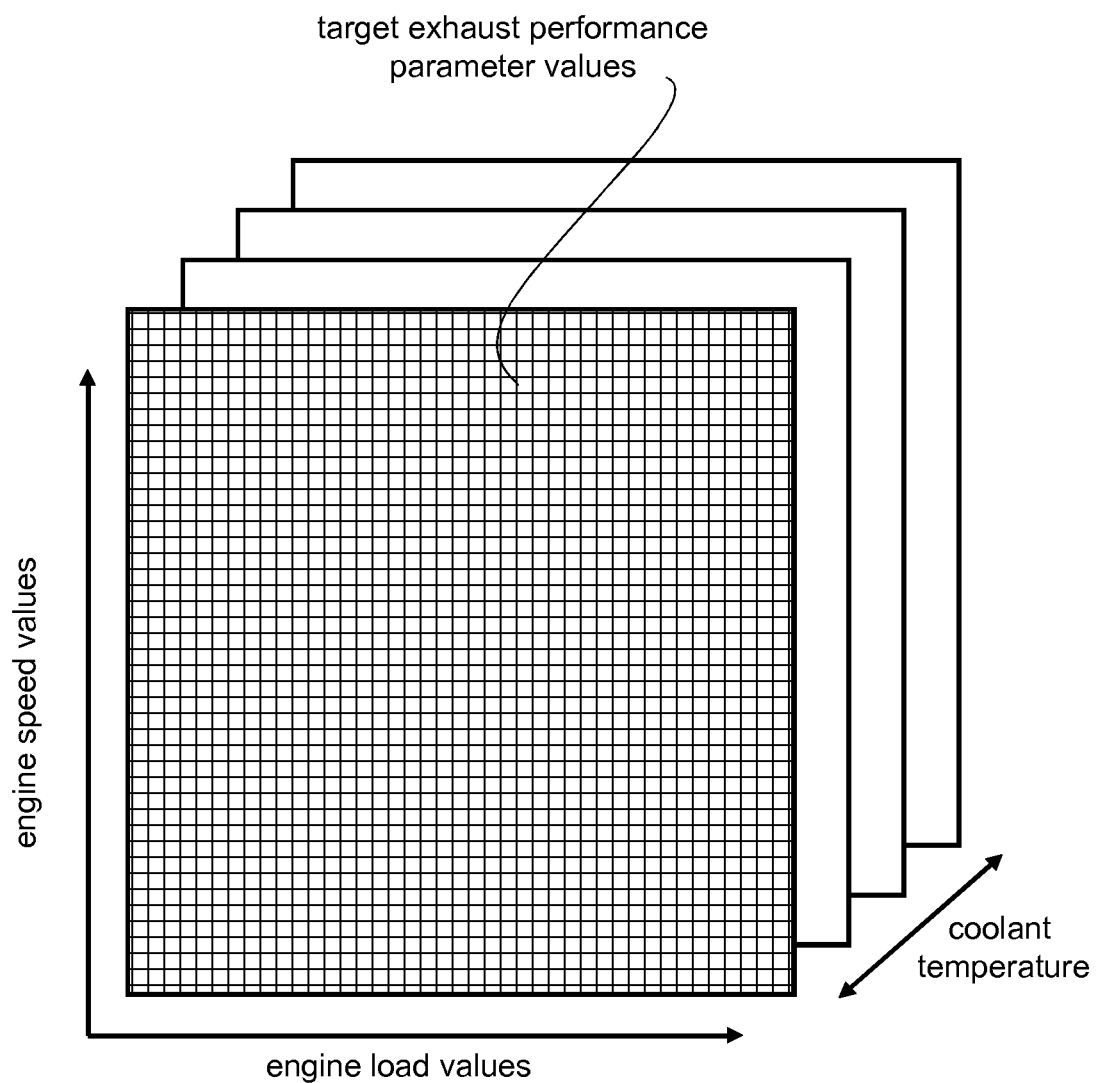
FIGS. 11a-c are schematic depictions of different example embodiments of a set of value maps.

FIG. 11a shows a schematic depiction of a set of value maps providing target exhaust performance parameter values depending on engine operation parameter values, in particular, depending on engine load values, engine speed values and coolant temperature values. The example embodiment shown in FIG. 11a discloses a set of value maps, wherein different value maps are provided for different coolant temperature values.

Figure 11B:
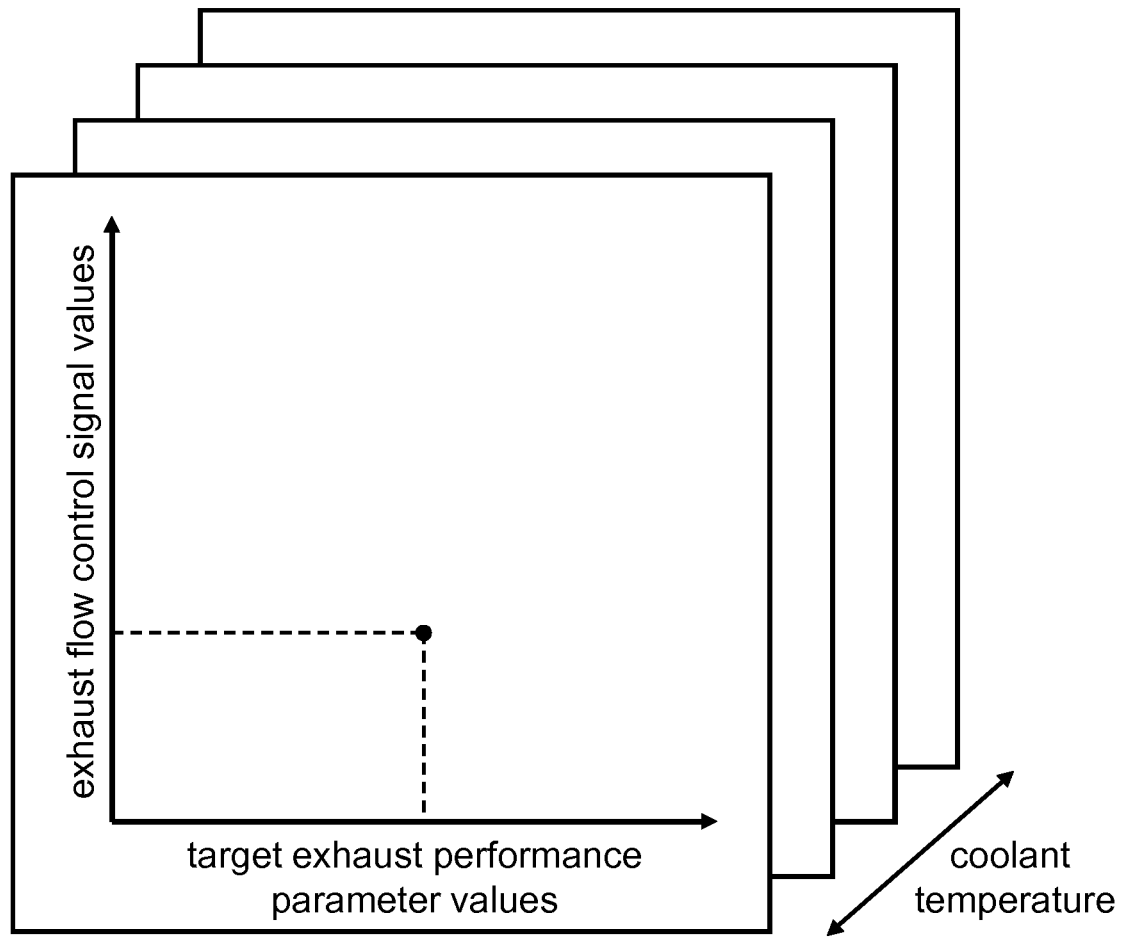

In particular, decoding target exhaust performance parameter value(s) into respective flow control signal values may be based on a set of value maps. An example embodiment of decoding a target exhaust performance parameter value to an exhaust flow control signal value is schematically depicted in FIG. 11b. Further preferably, not shown, the determined target exhaust performance parameter value may be decoded into a bypass flow control signal value and/or an air flow control signal value depending on a determined coolant temperature value. Preferably, such value maps are stored on a control unit 21. Most preferably, the dependency of target exhaust performance parameters and engine operation parameters is determined in a test bed environment.

Preferably, the set of value maps shown in FIG. 11a and the set of value maps shown in FIG. 11b may be integrated into one set of value maps. Preferably, each individual value map of a set of value maps can be in the form of a two-dimensional table, as depicted in FIGS. 11a, b, c, for example. Further preferably, each individual value map of a set of value maps can be in the form of a three- or more-dimensional table.

Figure 7:
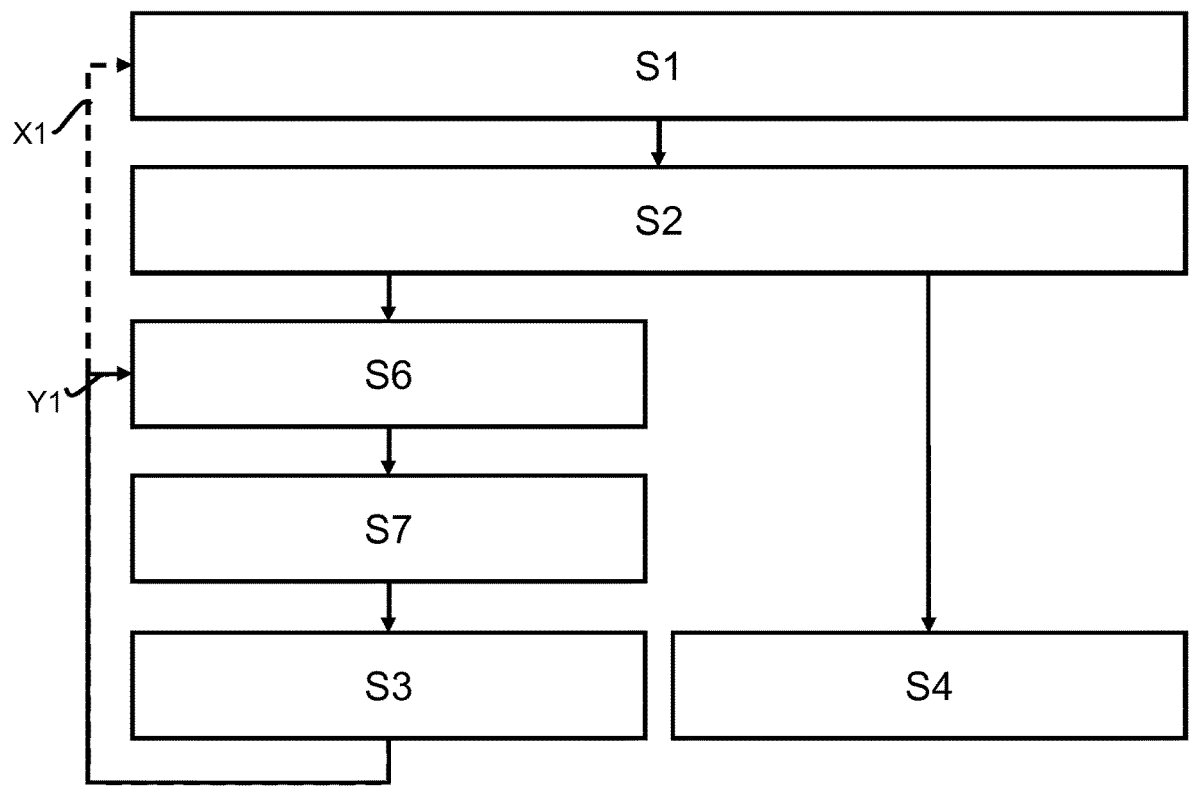
FIG. 7 is a schematic block diagram depicting steps in a further example embodiment of a method for controlling the internal combustion engine.
Figure 8:
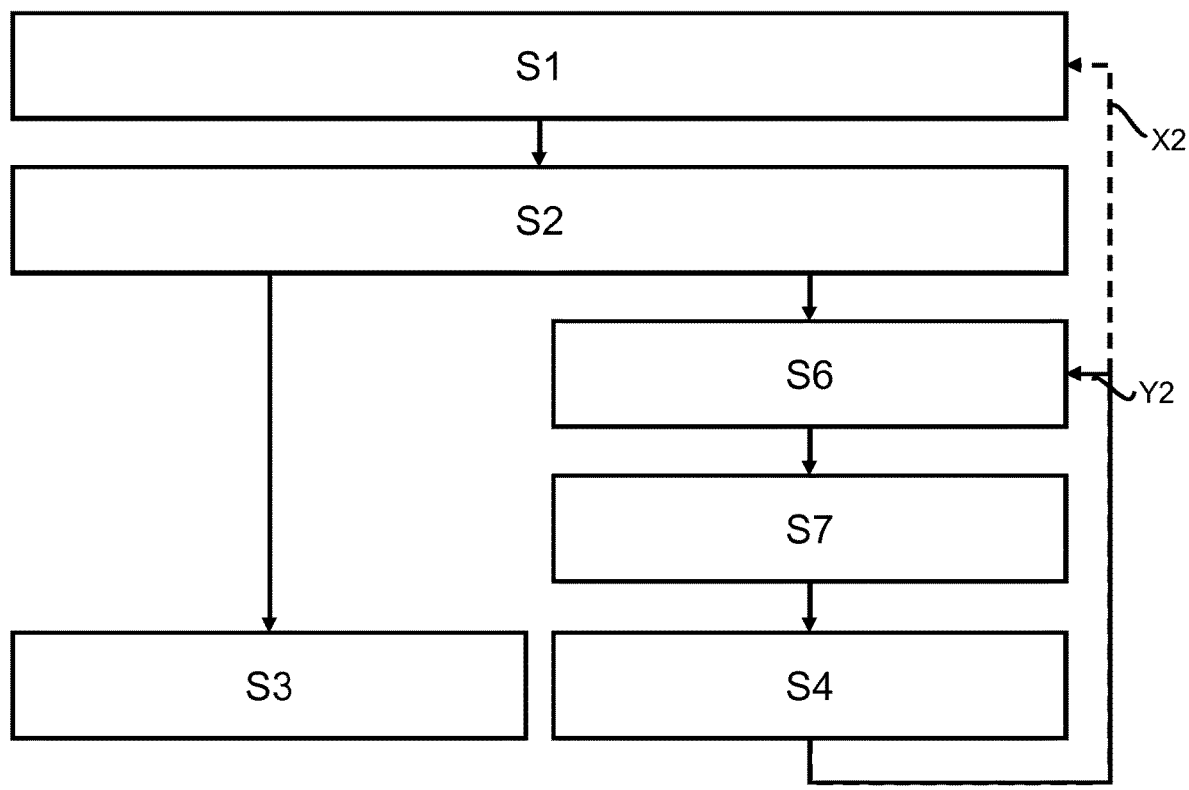
FIG. 8 is a schematic block diagram depicting steps in a further example embodiment of a method for controlling the internal combustion engine.
Figure 9:
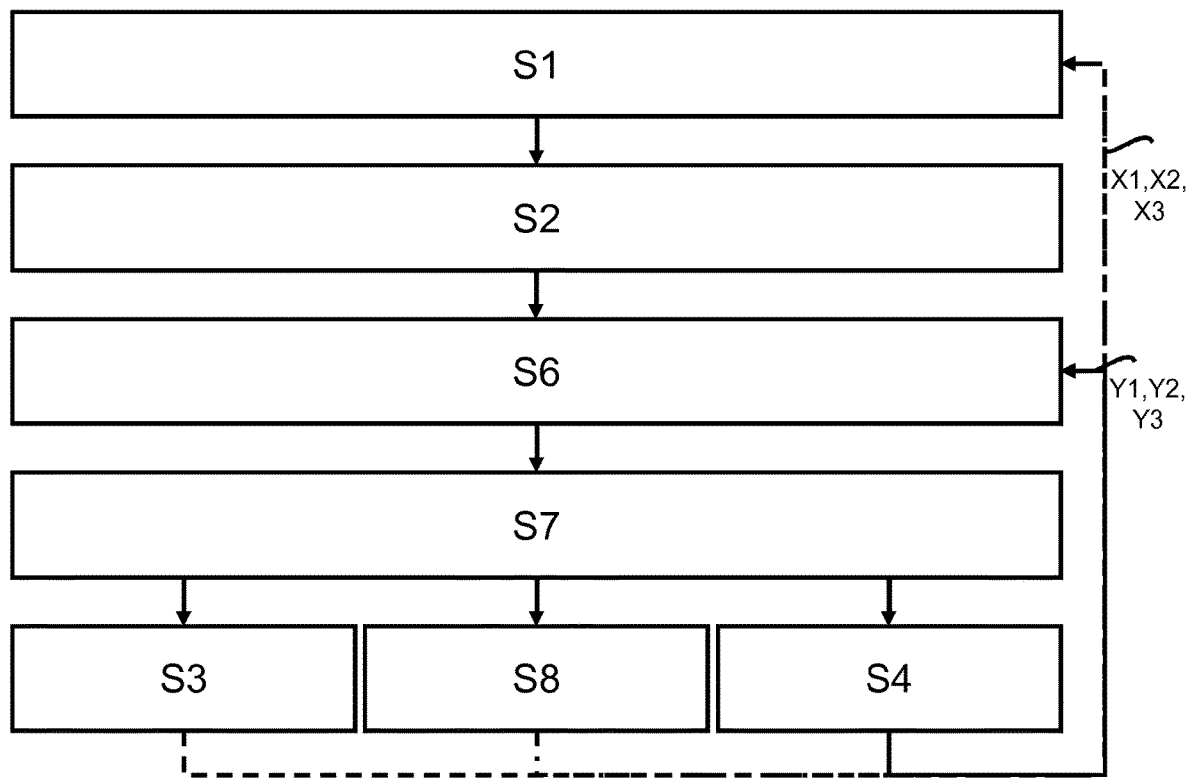
FIG. 9 is a schematic block diagram depicting steps in a further example embodiment of a method for controlling the internal combustion engine.

FIGS. 7 to 9 show further preferred example embodiments of the method for controlling an internal combustion engine 1, wherein the internal combustion engine 1 may be controlled depending on a deviation of a determined current exhaust performance parameter value from a determined target exhaust performance parameter value. Thus, the further preferred example embodiments shown in FIGS. 7 to 9 may further comprise the steps of determining a current exhaust performance parameter value S6 and determining a deviation of the current exhaust performance parameter value from a determined target exhaust performance parameter value S7.

Figure 14:
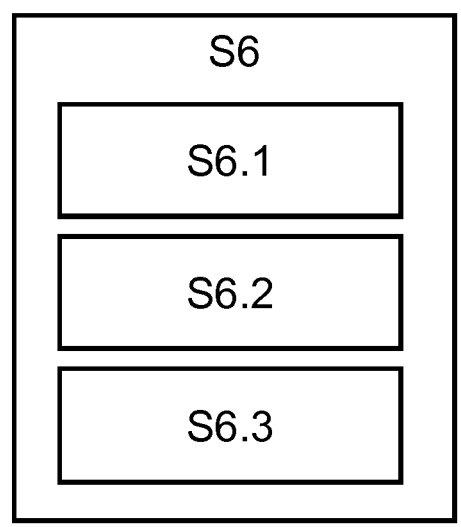
FIG. 14 is a schematic block diagram depicting detailed example steps to determine a current exhaust performance parameter value.
Figure 15:
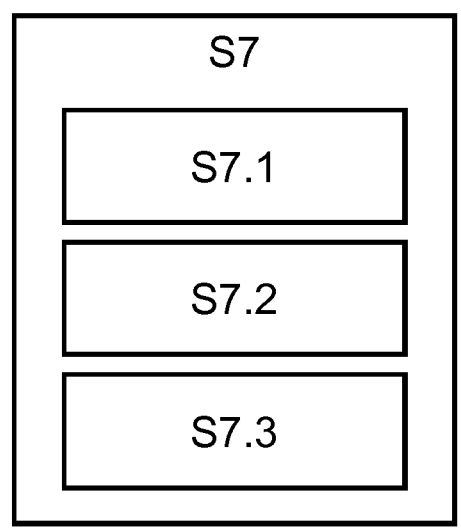
FIG. 15 is a schematic block diagram depicting detailed example steps to determine a deviation of the determined current exhaust performance parameter value from the determined target exhaust performance parameter value.

In particular, determining a current exhaust performance parameter value S6 may comprise the steps of determining an exhaust temperature value S6.1, determining an exhaust mass flow value S6.2 and/or determining an exhaust manifold pressure value S6.3 as depicted in FIG. 14. In particular, the step of determining a deviation of the current exhaust performance parameter value from the target exhaust performance parameter value may S7 may comprise the steps of determining a deviation of the current exhaust temperature value from the target exhaust temperature value S7.1, the step of determining a deviation of the current exhaust mass flow value from the target exhaust mass flow value S7.2, and the step of determining a deviation of the current exhaust manifold pressure value from the target exhaust manifold pressure value S7.3 as shown in FIG. 15.

In the preferred example embodiments shown in FIGS. 7 to 9 the air flow and/or the exhaust flow may be controlled depending on a deviation of the determined current exhaust performance parameter value from the determined target exhaust performance parameter value. In the example embodiment shown in FIG. 7 the internal combustion engine 1 is controlled, wherein the step of controlling the air flow S3 depends on a deviation of a determined current exhaust performance parameter value from a determined target exhaust performance parameter value and the step of controlling the exhaust flow depends on the determined target exhaust performance parameter value S4. In particular, the air flow is controlled closed loop and the exhaust flow is controlled open loop. In the example embodiment of the method shown in FIG. 8 an internal combustion engine 1 is controlled, wherein the air flow is controlled S3 depending on a determined target exhaust performance parameter value and the exhaust flow is controlled S4 depending on a deviation of a determined current exhaust performance parameter value from the determined target exhaust performance parameter. In particular, the air flow is controlled open loop and the exhaust flow is controlled closed loop. In the example embodiment of the method shown in FIG. 9 an internal combustion engine 1 is controlled, wherein the air flow and the exhaust flow are controlled S3, S4 depending on a deviation of a determined current exhaust performance parameter value from the determined target exhaust performance parameter. In particular, the air flow and the exhaust flow are controlled closed loop.

Closed loop control of an internal combustion engine 1 shall be explained based on the example embodiment shown in FIG. 7. Preferably, in a closed loop control, each step or a selection of steps may be executed in an iterative manner. For example, due to the controlled air flow, the exhaust performance of the internal combustion engine 1 will change. Preferably, the step of a current exhaust performance parameter value S6, and the step determining a deviation of the current exhaust performance parameter value from a determined target exhaust performance parameter value S7 are iteratively applied to control the air flow as indicated in FIG. 7 with Y1. Further, after the air flow has been controlled S3 at least one engine operation parameter value, in particular an engine speed value and/or an engine load value, may change. Thus, it may be preferred to also iteratively determine the value of at least one engine operation parameter S1 and the at least one target exhaust performance parameter value S2, as indicated in FIG. 7 with X1.

The steps for controlling the air flow closed loop as described for the example embodiment shown in FIG. 7 may also analogously apply, mutatis mutandis, to the exhaust flow to be controlled depending on a determined deviation value as shown in FIGS. 8 and 9 depicted by the different possible closed loop control alternatives for the exhaust flow depicted by the connections X2 between S4 and S1 and Y2 between S4 and S6.

Further preferably, an internal combustion engine 1 may be controlled according to an example embodiment shown in FIG. 9. In this preferred embodiments, the internal combustion engine 1 is further controlled by controlling the bypass flow S8. In particular, the step of controlling the bypass flow also depends on a deviation of a determined current exhaust performance parameter value from a determined target exhaust performance parameter value. Thus, the steps for controlling the air flow closed loop as described for the example embodiment shown in FIG. 7 may also analogously apply to the bypass flow to be controlled. The different possible closed loop control alternatives are depicted by the connections X3 between S8 and S1 and Y3 between S8 and S6.

Figure 10:
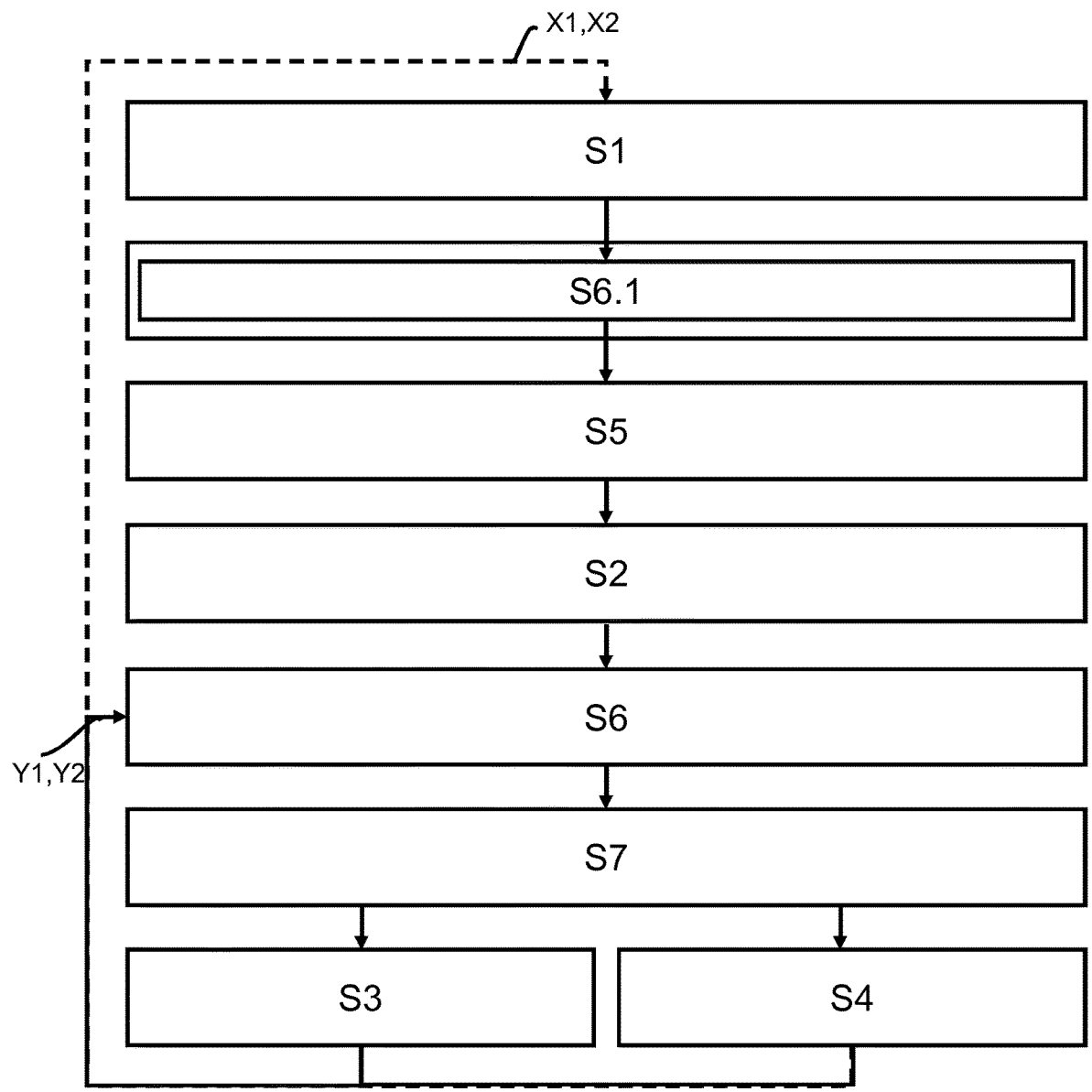
FIG. 10 is a schematic block diagram depicting steps in a further example embodiment of a method for controlling the internal combustion engine.
Figure 11C:
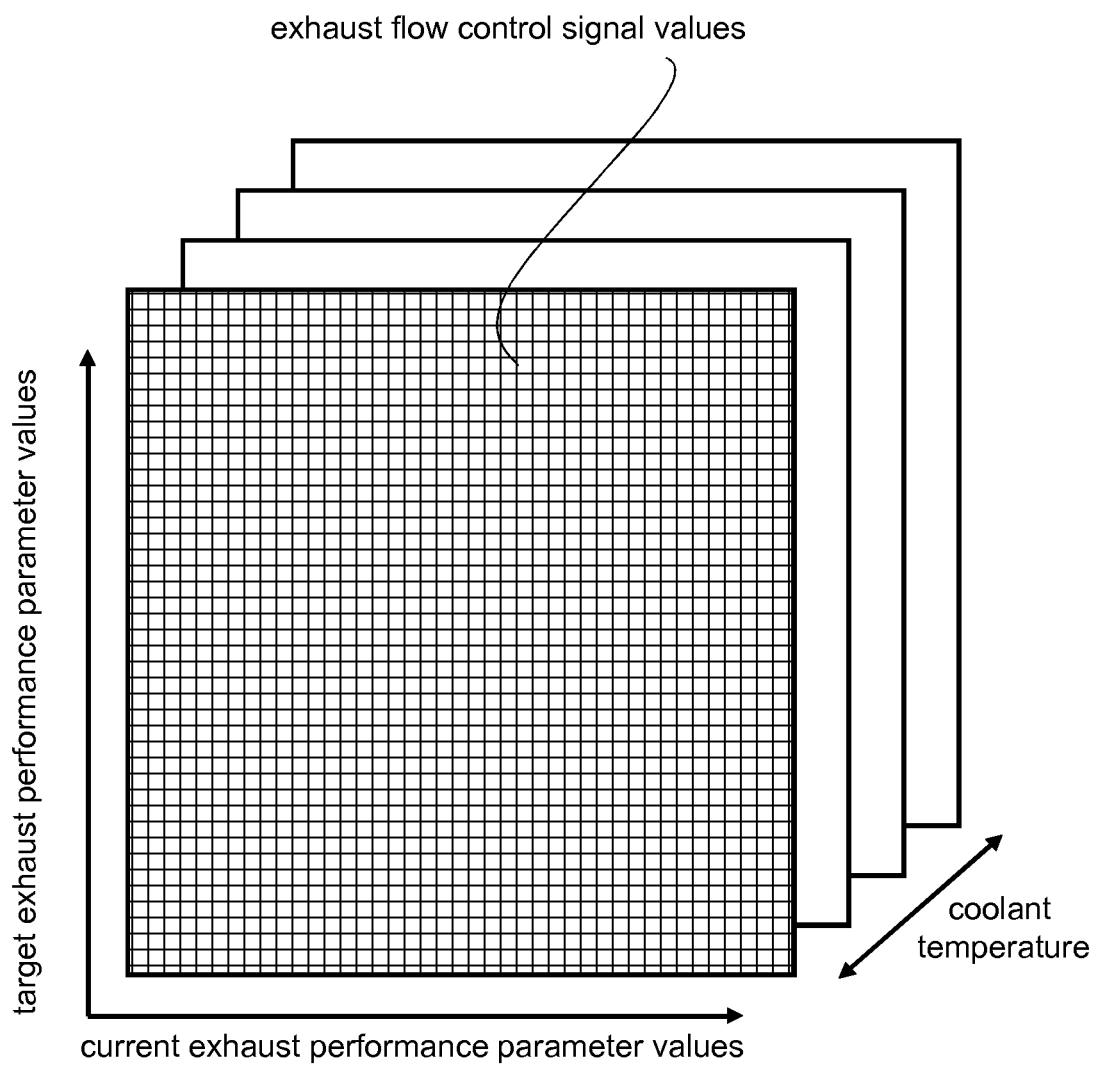

Preferably, the example embodiments depicted in FIGS. 7 to 9 may comprise the step of choosing a value map for determining the target exhaust performance parameter value S5 according to FIG. 11a. Further preferably, to control the exhaust flow, a set of value maps may be chosen according to FIG. 11c, wherein an exhaust flow control signal value may be identified depending on the deviation of a determined current exhaust performance parameter value from a determined target exhaust performance parameter value. This procedure applies analogously for controlling the air flow and the bypass flow. Preferably, the set of value maps shown in FIG. 11a and the set of value maps shown in FIG. 11c may be integrated into one set of value maps. In particular, the dependency between respective flow control signal values and a deviation of a determined current exhaust performance parameter value from a determined target exhaust performance parameter value and/or engine operation parameter values is determined in a test bed environment. Further preferably, value maps or a set of a value map is determined depending on a coolant temperature as shown in FIG. 11a-c and/or an ambient temperature FIG. 10 shows a further preferred example embodiment of a method for controlling an internal combustion engine 1 closed loop, particularly, by controlling the air flow and the exhaust flow closed loop. This preferred example embodiment comprises the step of determining a value of at least one engine operation parameter S1. Further preferably, a current exhaust temperature value may be determined S6.1 for determining the target exhaust performance parameter value S2. Particularly, the target exhaust performance parameter value shall be determined by means of a value map. Thus, a corresponding value map shall be determined S5. In particular, the target exhaust performance parameter value shall be determined depending on the determined engine operation parameter and the determined exhaust temperature value. Further preferably, in a further step, the method comprises the step of determining a current exhaust performance parameter value S6. Based on the determined current exhaust performance parameter value and the determined target exhaust performance parameter value a deviation shall be determined S7. Depending on the deviation of the determined current exhaust performance parameter value from the determined target exhaust performance parameter value the air flow and the exhaust flow may be controlled S3, S4.

Preferably, the method steps, in particular at least some or all of the steps of the method described herein, may preferably be applied in the sequence described herein. Further preferably, some or all of the method steps may be applied in a sequence different from the sequence described herein. Preferably, some or all of the method steps may be applied in parallel. Further preferably, the method steps, at least some or all of the method steps, may be applied in sequence.

It is to be understood that the present invention is not limited to the embodiments described above and illustrated in the drawings; rather, the skilled person will recognize that many changes and modifications may be made within the scope of the appended claims.

The invention claimed is:

1. A method for controlling an internal combustion engine comprising a cylinder, an air guide arranged to guide an air flow to the cylinder, an adjustable air flow restriction element arranged upstream of the cylinder to control the air flow guided through the air guide, an exhaust guide arranged to guide an exhaust flow from the cylinder, an adjustable exhaust flow restriction element arranged downstream of the cylinder to control the exhaust flow through the exhaust guide, and the method comprising the steps:
 determining a value of at least one engine operation parameter, wherein the at least one engine operation parameter is at least one of the following:
  an engine speed,
  an engine load,
  a coolant temperature, and
  an ambient temperature,
 determining a target value of an exhaust performance parameter depending on the determined engine operation parameter value, wherein the exhaust performance parameter is an exhaust temperature and an exhaust manifold pressure;
 determining a current exhaust performance parameter value, wherein the current exhaust performance parameter value is a current exhaust temperature value and the current exhaust manifold pressure value;
 depending on the determined target exhaust performance parameter value,
  controlling the air flow through the air guide depending on a deviation of the determined current exhaust temperature value from the determined target exhaust temperature value and
  controlling the exhaust flow through the exhaust guide depending on a deviation of the determined current exhaust manifold pressure value from the determined target exhaust manifold pressure value.

2. The method according to claim 1 comprising:
 determining an engine speed value and/or determining an engine load value, and
 determining the target exhaust performance parameter value depending on the determined engine speed value and/or the determined engine load value.

3. The method according to claim 1 comprising:
 wherein the at least one engine operation parameter is the coolant temperature value and/or the ambient temperature value and/or wherein the exhaust performance parameter is the exhaust temperature value, and
 choosing a value map for determining the target exhaust performance parameter value depending on the coolant temperature value and/or the ambient temperature value and/or the exhaust temperature value, and/or
 determining the target exhaust performance parameter value depending on the coolant temperature value and/or the ambient temperature value and/or the exhaust temperature value.

4. The method according to claim 1 comprising:
 transforming a determined target exhaust power value to a target exhaust temperature value and/or to a target exhaust mass flow value.

5. The method according to claim 1 comprising: controlling a bypass flow through a bypass guide to bypass the bypass flow from the cylinder past a turbine and, an adjustable bypass flow restriction element arranged to control the bypass flow guided through the bypass guide
 depending on the determined target exhaust performance parameter value; and/or
 depending on the deviation of the determined current exhaust performance parameter value from the determined target exhaust performance parameter value.

6. A non-transitory computer readable medium carrying a computer program comprising program code for performing the steps of claim 1 when said program code is run on a computer.

7. A control unit for controlling the internal combustion engine, wherein the control unit is configured to perform the steps of the method according to claim 1.

8. An internal combustion engine comprising
 the cylinder,
 the turbo charger having a compressor and a turbine driving the compressor,
 the air guide arranged to guide an air flow from the compressor to the cylinder, the adjustable air flow restriction element arranged between the compressor and the cylinder and arranged to control the air flow guided through the air guide, and the exhaust guide arranged to guide an exhaust flow from the cylinder to the turbine, the adjustable exhaust flow restriction element arranged between the cylinder and the turbine and arranged to control the exhaust flow through the exhaust guide, wherein the internal combustion engine comprises the control unit according to claim 7.

9. An internal combustion engine according to claim 8, wherein the internal combustion engine comprises an exhaust flow temperature sensor arranged downstream of the cylinder, and/or an engine coolant system having a coolant temperature sensor, and/or an ambient temperature sensor arranged peripheral to the internal combustion engine, and/or an exhaust flow pressure sensor arranged downstream of the cylinder, and/or an air flow pressure sensor arranged upstream of the cylinder.

10. A vehicle comprising an internal combustion engine according to claim 8.

11. A vehicle according to claim 10 comprising an exhaust aftertreatment system.

* * * * *